(12) United States Patent
Hillyard

(10) Patent No.: US 9,665,601 B1
(45) Date of Patent: May 30, 2017

(54) USING A MEMBER ATTRIBUTE TO PERFORM A DATABASE OPERATION ON A COMPUTING DEVICE

(75) Inventor: Paul Byron Hillyard, Lindon, UT (US)

(73) Assignee: Crimson Corporation, Dover, DE (US)

(*) Notice: Subject to any disclaimer, the term of this patent is extended or adjusted under 35 U.S.C. 154(b) by 262 days.

(21) Appl. No.: 12/969,912

(22) Filed: Dec. 16, 2010

(51) Int. Cl.
*G06F 7/00* (2006.01)
*G06F 17/00* (2006.01)
*G06F 17/30* (2006.01)

(52) U.S. Cl.
CPC .............................. *G06F 17/30292* (2013.01)

(58) Field of Classification Search
CPC ......... G06F 17/30569; G06F 17/30604; G06F 17/30067; G06F 17/30292; G06F 17/30297; G06F 17/30424; G06F 17/30607; G06F 8/71; G06F 9/4448
See application file for complete search history.

(56) References Cited

U.S. PATENT DOCUMENTS

| | | | |
|---|---|---|---|
| 5,596,746 A * | 1/1997 | Shen et al. | |
| 5,937,409 A * | 8/1999 | Wetherbee | |
| 6,101,502 A * | 8/2000 | Heubner et al. | |
| 6,785,690 B1 * | 8/2004 | Davidson | 707/802 |
| 7,296,028 B1 * | 11/2007 | Ivanova | |
| 2003/0065662 A1 * | 4/2003 | Cosic | G06F 17/3056 |
| 2004/0181538 A1 * | 9/2004 | Lo et al. | 707/100 |
| 2007/0083850 A1 * | 4/2007 | Kapoor et al. | 717/106 |
| 2009/0063555 A1 * | 3/2009 | Fisher | G06F 17/30595 |
| 2009/0271158 A1 * | 10/2009 | Yeh et al. | 703/2 |
| 2009/0327324 A1 * | 12/2009 | Laflen | G06F 17/30312 |
| 2011/0295795 A1 * | 12/2011 | Venkatasubramanian et al. | 707/602 |

* cited by examiner

*Primary Examiner* — Taelor Kim

(57) ABSTRACT

A computing device configured for using a member attribute to perform a database operation is described. The computing device includes a processor and instructions stored in memory. The computing device generates an object based on a class with a member. The member has an associated attribute that indicates a database mapping. The computing device also performs a database operation based on the attribute.

16 Claims, 11 Drawing Sheets

USING A MEMBER ATTRIBUTE TO PERFORM A DATABASE OPERATION ON A COMPUTING DEVICE

TECHNICAL FIELD

The present disclosure relates generally to computers and computer-related technology. More specifically, the present disclosure relates to using a member attribute to perform a database operation on a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. On a network, one or more servers may provide data and/or services. A computer network may have hundreds or even thousands of computers.

Managing data is an important aspect of computing. For example, computer programs may generate and manipulate data. However, some challenges with managing data include storage, conversion and/or transfer of data. For instance, some data may need to be stored for later use. Furthermore, some systems or programs may use different data formats or types than others. As can be observed from this discussion, systems and methods that assist in data management may be beneficial.

DETAILED DESCRIPTION

Figure 1:
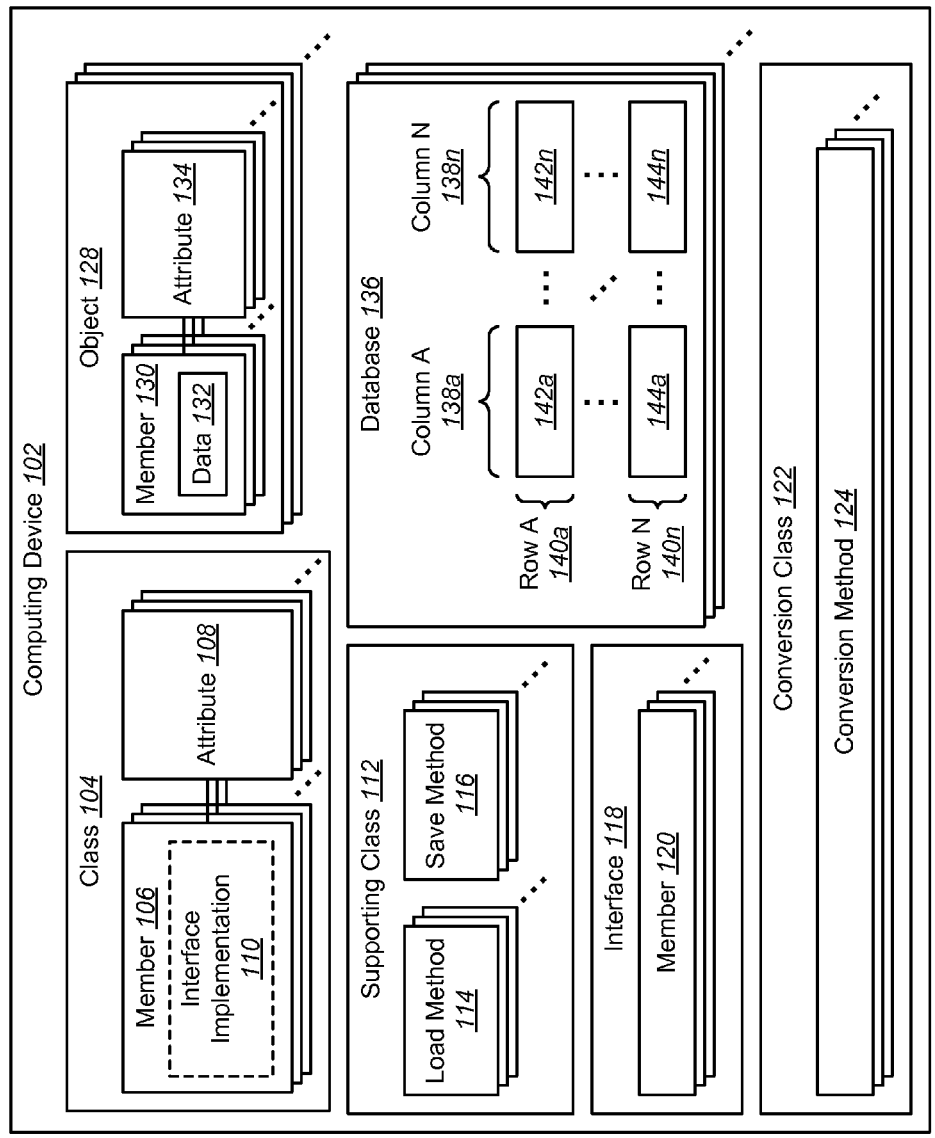
FIG. 1 is a block diagram illustrating one configuration of a computing device in which systems and methods for using a member attribute to perform a database operation may be implemented.

A computing device configured for using a member attribute to perform a database operation is disclosed. The computing device includes a processor and executable instructions stored in memory. The computing device generates an object based on a class with a member. The member has an associated attribute that indicates a database mapping. The computing device also performs a database operation based on the attribute. The associated attribute may indicate that member data is mapped to a database column. The computing device may also generate a supporting object based on a supporting class with a method for performing a database operation based on the attribute. The attribute may be an attribute according to the MICROSOFT .NET software framework.

Performing a database operation may include storing member data in a database based on the attribute. Performing a database operation may also include retrieving the member data from the database and reconstructing the object based on the member data. Performing a database operation may also include transmitting information from the database using a network. Performing a database operation further may include converting a data type of the member data. Performing a database operation may include storing the member data in another database.

A method configured for using a member attribute to perform a database operation is also disclosed. The method includes generating, on a computing device, an object based on a class with a member. The member has an associated attribute that indicates a database mapping. The method also includes performing, on the computing device, a database operation based on the attribute.

A non-transitory tangible computer-readable medium for using a member attribute to perform a database operation is also disclosed. The computer-readable medium includes executable instructions for generating an object based on a class with a member. The member has an associated attribute that indicates a database mapping. The computer-readable medium also includes executable instructions for performing a database operation based on the attribute.

The systems and methods disclosed herein may be implemented in software, hardware or a combination of both. The systems and methods disclosed provide an approach to performing object-relational mapping (ORM).

The systems and methods disclosed herein may use attributes (e.g., .NET attributes) to allow a developer to "tag" individual properties or fields within a predefined class as columns in a database row. One benefit of the systems and methods disclosed herein is that a developer is not required to use a "class designer" system used by many object-relational mapping (ORM) systems. This may provide a much smaller learning curve as compared to a typical object-relational mapping (ORM) system. The systems and methods disclosed herein provide read/write data transfer capabilities when creating or saving object instances (e.g., .NET object instances) to a database.

One example of the systems and methods is given hereafter. In this example, the attribute "[EColumn]" is created with several possible versions. These versions are listed as follows. "[EColumn]" indicates a database column with the same name as the following field or property. "[EColumn (string "NewName")]" indicates a database column named "NewName" that should be associated with the following field or property. "[EColumn(string "NewName", bool readOnly)]" indicates a database column named "NewName" that should only be read, but not written back when the class is serialized back to the database. [EColumn(bool readOnly)] indicates a database column that should only be read, but not written back when the class is serialized back to the database. In one configuration, serializing to the database includes saving a class object as columns of a row in a table in a database. There may be a mapping between an in-memory object's members (e.g., fields and/or properties) and the columns in a database table. In one example, the names of the object's members and the columns may match. In some cases, the object members (e.g., fields and/or properties) come from one or more other tables' columns (e.g., "secondary" tables' columns) that were joined with the primary table when it was read in from the database. An attribute (e.g., an EColumn attribute) that is associated with (e.g., placed on top of) a member (e.g., property and/or field) allows specification of which table and column the data should come from.

One example of a supporting class with the following methods may provide load/save features as illustrated in Listing (1).

```
public static DBSaveable GetFromRow(Type type,
   DataRow row, DBLoadSaveLevel whatToLoad);
public static List<DBSaveable>Load(string sql, DBLoad-
   SaveLevel whatToLoad, Type t, params object[ ] other-
   Params);
public                                              static
   List<DBSaveable>LoadMultipleWithColumnValue
   (Type t, DBLoadSaveLevel whatToLoad, string col-
   umnName, object value);
public  static  T  LoadWithColumnValue<T>(DBLoad-
   SaveLevel whatToLoad, string columnName, object
   value);
public static DBSaveable LoadWithColumnValue(Type t,
   DBLoadSaveLevel whatToLoad, string columnName,
   object value);
public  static  T  LoadWithID<T>(DBLoadSaveLevel
   whatToLoad, int id);
public static DBSaveable LoadWithID(Type t, DBLoad-
   SaveLevel whatToLoad, int id);
public static int Save(DBSaveable o);
```

Listing (1)

According to the example illustrated in Listing (1), this implementation requires the developer to derive any classes he wishes to load/save from the database from the interface "DBSaveable". This is only one possible implementation. Another implementation may involve the use of another attribute that would be used to specify a database table and primary key column. One example of the "DBSaveable" interface is illustrated in Listing (2).

```
public interface DBSaveable
{
   int ID {get; set;}
   string IDColumnName {get;}
   string TableName {get;}
   void  OnLoadFromDB(RowHelper  rh,  DBLoad-
      SaveLevel whatToLoad);
}
```

Listing (2)

One example of a class that may be used in accordance with the systems and methods disclosed herein is illustrated in Listing (3).

```
public class MyClass
{
   public enum MyEnum
   {
      MyEnum1,
      MyEnum2
   };
   public int MyInt;
   public                                           MyEnum
      MyEnumInstance=MyEnum.MyEnum1;
   public int MyString="my string";
   public int MyForeignKeyReference;
   public string NotInTheDatabase;
   public int NotInTheDatabase;
}
```

Listing (3)

Given the class illustrated in Listing (3), a developer could make this class serializable to a database table as illustrated in Listing (4). It should be noted that the example illustrated in Listing (4) was defined using an Extensible Markup Language (XML) schema definition.

```
<table name="MyTable">
   <column     name="MyTable_Idn"     type="Int"
      identity="Yes" null="No"/>
   <column name="MyInt" type="Int"/>
   <column    name="MyEnumInstanceDifferentName"
      type="Int"/>
   <column    name="MyString"    type="varchar(255)"
      null="No"/>
   <column        name="MyForeignKeyReference"
      type="Int" null="No"/>
   <foreignKey         name="MyForeignKeyRef"
      foreignTable="ForeignTable">
      <foreignKeyColumn
         column="MyForeignKeyReference"
         foreignColumn="ForeignTable_Idn"/>
   </foreignKey>
</table>
```

Listing (4)

Continuing with the example, a developer might implement the "DBSaveable" interface as illustrated in Listing (5).

```
#region DBSaveable Members
public int ID
{
   get {return MyInt;}
   set {MyInt=value;}
}
public string TableName
{
   get {return "MyTable";}
}
public string IDColumnName
{
   get {return "MyTable_Idn";}
}
```

```
public void OnLoadFromDB(RowHelper rh, DBLoad-
    SaveLevel whatToLoad)
{ }
#endregion
```

Listing (5)

In Listing (5), it should be noted that no code may be required within the "OnLoadFromDB" method. However, if other queries are needed to be performed, code may be added to that method to perform the other queries. Continuing the example, a developer may add attributes to a class to implement read/write functionality as illustrated in Listing (6). It should be noted that fields that were not changed (compared to Listing (3)) are not listed in Listing (6).

```
[EColumn]
public int MyInt;
[EColumn("MyEnumInstanceDifferentName")]
public MyEnum MyEnumInstance=MyEnum.MyEnum1;
[EColumn]
public int MyString="my string";
[EColumn(true)]
public int MyForeignKeyReference;
```

Listing (6)

According to this example, the developer may use the support class' Load( ) and Save( ) methods to enumerate, find, and save individual "MyClass" instances associated with rows in the database table "MyTable".

The systems and methods disclosed herein provide an object-relational mapping (ORM) that may relieve a developer from the responsibility of repeatedly writing insert, update and query logic for each new class defined that he wishes to serialize to a database. The systems and methods disclosed herein may also provide a single location for the conversion logic between database types and other programming types (e.g., .NET types). In the example given above, the "RowHelper" class provides this functionality. Thus, benefits of the systems and methods disclosed herein may include a smaller learning curve for their use compared to a typical object-relational mapping (ORM) solution, thereby allowing a faster "payoff" for using these systems and methods. The systems and methods disclosed herein may also integrate easily into an existing code base and database schema where it is impractical or inconvenient to "rewrite everything."

It should be noted that a full-fledged object-relational mapping (ORM) may provide other features, including the monitoring of "dirty" fields and perhaps the saving of table relationships. However, such object-relational mapping (ORM) systems typically require one to run a "designer" that generates the (complex) classes in a programming language of choice. Using that approach, a developer then writes code that interacts with these classes when he wishes to load/save information to a database.

In contrast, the systems and methods disclosed herein allow the use of a class (e.g., .NET, C++ class, etc.) "as is" or "out of the box." The fields/properties (e.g., "members") of such classes may be accordingly tagged with their database association. Then, one or more additional fields/properties may be added for required attributes such as the database table name and the primary key column name. In one configuration, for example, a class may be derived from a "DBSaveable" interface as illustrated in Listing (7).

```
public interface DBSaveable
public interface DBSaveable
{
    int ID {get; set;}
    string TableName {get;}
    string IDColumnName {get;}
    void OnLoadFromDB(RowHelper rh, DBLoad-
        SaveLevel whatToLoad);
}
```

Listing (7)

It should be noted that in the DBSaveable interface illustrated in Listing (7), a default constructor (e.g., without parameters) may also be needed (unless "DB.GetWithID" or "DB.GetWithColumnValue" functions are not called, for example).

Various configurations are now described with reference to the Figures, where like reference numbers may indicate identical or functionally similar elements. The present systems and methods, as generally described and illustrated in the Figures herein, could be arranged and designed in a wide variety of different configurations. Thus, the following more detailed description of several configurations of the present systems and methods, as represented in the Figures, is not intended to limit the scope of the systems and methods, as claimed, but is merely representative of the configurations of the systems and methods.

It should be noted that multiple Figure elements may be indicated using letters in some instances. For example, multiple similar elements may be indicated with a letter suffix (e.g., a letter following an element number) from a to n. However, it should be noted that while different groups of multiple elements may be indicated with a same letter suffix (e.g., n), this does not necessarily indicate that there are the same number of elements in the different groups. For instance, a first group of elements from a to n may or may not have the same number of elements in a second group of elements from a to n.

FIG. 1 is a block diagram illustrating one configuration of a computing device 102 in which systems and methods for using a member attribute to perform a database operation may be implemented. Examples of the computing device 102 include desktop computers, laptop computers, servers, smart phones, tablet devices, game consoles, supercomputers and/or other devices with a processor and memory. The computing device 102 may include a class 104, one or more objects 128 and one or more databases 136 (e.g., database 136 tables). The computing device 102 may optionally include a supporting class 112, an interface 118 and/or a conversion class 122.

The class 104 may be a programmatic class comprising instructions, code and/or data. For example, the class 104 may include computer instructions and/or data that may be used to generate an instance (e.g., object 128) of the class 104. For instance, the class 104 may be a class that conforms to the MICROSOFT .NET software framework and/or a programming language such as C++, C#, JAVA, PYTHON, VISUAL BASIC, OBJECTIVE C, etc.

The class 104 may include one or more members 106 and one or more attributes 108. Examples of class members 106 may include fields, properties, variables, methods, functions, operations, etc. In some configurations, a member 106 may implement an interface 118 or include an interface implementation 110. As illustrated in FIG. 1, for instance, an interface 118 may include one or more members 120. Each of the interface members 120 may be a member definition or declaration, such as a definition or declaration of a field, property, method, function, operation, etc. It should be noted that some programming languages may only allow interface members 120 such as methods, functions and/or operations, etc. In the case that a class member 106 includes an interface implementation 110, that class member 106 may include code, instructions and/or data that provide functionality and/or value(s) for a declared or defined interface member 120. It should be noted that using an interface 118 may only be one possible configuration of the systems and methods disclosed herein. Advantages to using an interface 118 may include code re-use and requiring a class 104 to implement certain members. Alternatively, no interface 118 may be used.

The one or more attributes 108 may comprise data or information (e.g., metadata) that can be associated with a member 106. More specifically, an attribute 108 may include data or information associated with a member 106. In one configuration, programming code for the attribute 108 may be placed preceding (e.g., above) programming code for the member 106 it is to be associated with. For example, "[EColumn]" is placed directly above "public int MyInt;" in Listing (6), above, to indicate that the EColumn attribute 108 is associated with the "MyInt" member 106 that follows. In some cases, a compiler (e.g., the computing device 102) may automatically associate attribute 108 code with a member 106 that is described in code following the attribute 108 code. Additionally or alternatively, code for an attribute 108 may specify a particular target (member 106) for association. The programming code for the attribute 108 may be an instruction to a compiler to add metadata to a particular member 106. Adding metadata to the member 106 may occur at compile time. Thus, when the class 104 is compiled, a compiler may associate attribute 108 metadata with a member 106. In other words, the attribute 108 comprises metadata or a tag for a member 106.

According to the systems and methods disclosed herein, each attribute 108 may indicate a database 136 mapping. In one configuration, each attribute 108 indicates a column 138 in a database 136 (and/or database 136 table). One or more of the attributes 108 may optionally include additional information, such as a column name (that is different from a member 106 identifier, for example) and/or other characteristics or properties (e.g., read-only, etc.). For example, foreign keys (that reference another database 136, for example) in a database 136 may need to be preserved and not overwritten. A read-only characteristic or property in an attribute 134 may thus set a column 138 to be read-only, thus preserving that column's 138 data. This may be particularly useful when multiple databases 136 are related or joined. More detail is given below on how a read-only characteristic indicated in an attribute 134 may be used according to the systems and method disclosed herein.

The computing device 102 may generate one or more instances of the class 104. A class 104 instance may be referred to herein as an object 128. In other words, a computing device 102 may generate an object 128 by instantiating the class 104. As illustrated in FIG. 1, the computing device 102 may generate one or more objects 128 based on the class 104.

Each object 128 may include one or more members 130 and one or more attributes 134. The one or more object members 130 may correspond to the one or more class members 106 and the one or more object attributes 134 may correspond to one or more attributes 108 from the class 104. Each object member 130 may include data 132. The data 132 may be information corresponding to the object member 130. For instance, data 132 may include field, property and/or variable information and/or information corresponding to a method, function and/or operation. It should be noted that every member 106 included in a class 104 may not necessarily have an associated attribute 108. Similarly, every one of the members 130 of an object 128 may not necessarily have an associated attribute 108. In some configurations, however, all of the members 106, 130 in the class 104 or object 128 may respectively have an associated attribute 108, 134.

Each attribute 134 may indicate a database 136 mapping. In one configuration, each attribute 134 indicates a mapping of an object member 130 to a database column 138. For example, the computing device 102 may map member data 132 into a database column 138 indicated by the member's 130 associated attribute 134. Other additional or alternative mappings may be used, such as mapping each member's data 132 to a particular database row 140. In one configuration, the computing device 102 maps each member's 130 data 132 to a database column 138a-n (based on each attribute 134) and maps each object 128 (e.g., each member's 130 data 132 of each object 128) to a different database row 140a-n. For example, the computing device 102 may map each member's 130 data 132 of a first object 128 to columns A-N 138a-n of row A 140a (e.g., cells 142a-n) and so on up to each member's 130 data 132 of a last object 128 to columns A-N 138a-n of row N 140n (e.g., cells 144a-n). The computing device 102 may perform a database 136 operation that involves one or more objects 128. For instance, the phrase "database operation" as used herein may include one or more of mapping, storing, loading, retrieving, reconstructing and/or transmitting objects 128 or database 136 information.

The computing device 102 may optionally include a supporting class 112. The supporting class 112 may include one or more load methods 114 and/or one or more save methods 116. Additionally or alternatively, the supporting class 112 may include one or more conversion methods 124 (instead of or in addition to a separate conversion class 122). The one or more save methods 116 may be used to store one or more objects 128 (e.g., member data 132) to one or more databases 136. For example, a save method 116 may include instructions used to write member 130 data 132 into the database 136. Additionally or alternatively, a save method 116 may be used to create a database 136 and/or database 136 tables for storing member data 132. The one or more load methods 114 may be used to retrieve information from the one or more databases 136. For example, a load method 114 may be used to retrieve information from the database 136 that is used to reconstruct an object 128 that has been stored in the database 136. For instance, the computing device 102 may use one or more load methods 114 and/or one or more save methods 116 for storing, retrieving, transmitting and/or converting objects 128. It should be noted that the supporting class 112 is optional. In other configurations, save and/or load functionality or instructions (e.g., one or more save methods 116 and/or one or more load methods 114) may be implemented as part of the class 104 and/or received from another device.

The computing device 102 may optionally include a conversion class 122. The conversion class 122 may include one or more conversion methods 124. The one or more conversion methods 124 may be used to convert an object 128 data type into a data type that is compatible with one or more databases 136. In one example, an object 128 may have a member 130, including a particular data type (e.g., .NET data type). One or more conversion methods 124 may be used to convert the member data 132, such as a string, character (e.g., "char" type), floating point number (e.g., "float" type) or a double-precision number (e.g., "double" type), etc., into a different type (e.g., "long" type) that may be stored in the database 136. In another example, a conversion method 124 may be used to convert data stored in one database 136 to data types compatible with another database (e.g., to convert an SQL database 136 into a format compatible with a MICROSOFT ACCESS database 136 or an ORACLE database 136).

As noted above, the one or more conversion methods 124 may be included in a supporting class 112 instead of or in addition to the conversion class 122. In yet another configuration, one or more load methods 114, one or more save methods 116 and/or one or more conversion methods 124 may be included in the class 104. Additionally or alternatively, instructions with functionality equivalent to the one or more load methods 114, one or more save methods 116 and/or one or more conversion methods 124 may be received from another device to perform the corresponding operations described above.

Some examples of objects 128 may include task, distribution package, vulnerability definition, query, user and computer objects 128. The systems and methods disclosed herein may allow one or more of these objects to be saved to a database 136, loaded from a database 136 and/or transmitted to another computing device 102. For example, a task object 128 may include one or more members 130 that indicate a particular task to be performed. Each of these members 130 may be "tagged" by an attribute that indicates a mapping into a database 136 column. Thus, the computing device 102 may store, retrieve (e.g., reconstruct) and/or transmit one or more task objects 128 using the systems and methods disclosed herein.

A vulnerability definition object 128 may include one or more members 130 that designate computing device 102 vulnerabilities. For instance, a vulnerability definition object 128 may include one or more members 130 including definitions for viruses, malware, spyware, adware, Trojans, worms, bugs, etc. Thus, this vulnerability definition object 128 may have a virus member 130 that contains data that may indicate to a computing device 102 how to patch or alleviate current or possible problems stemming from that virus. The systems and methods disclosed herein may allow an attribute 134 to be associated with this virus member 130 that indicates how it may be stored in the database 136. The computing device 102 may store the virus member 130 in the database 136 in a virus column 138 corresponding to the virus member 130. Database 136 information may then be loaded in order to reconstruct the vulnerability definition object 128 for later use or may be transmitted to another computing device that may reconstruct the vulnerability definition object 128 from the database 136 information according to the systems and methods herein. The other computing device may then use the vulnerability definition object 128 to patch or alleviate possible problems associated with the virus.

Other examples of objects that may be used according to the systems and methods disclosed herein include user and computer objects 128. Such objects 128 may be used to track user activities on a network and/or computer configurations, statuses, etc. Yet other kinds of objects 128 may be used in accordance with the systems and methods disclosed herein.

Figure 2:
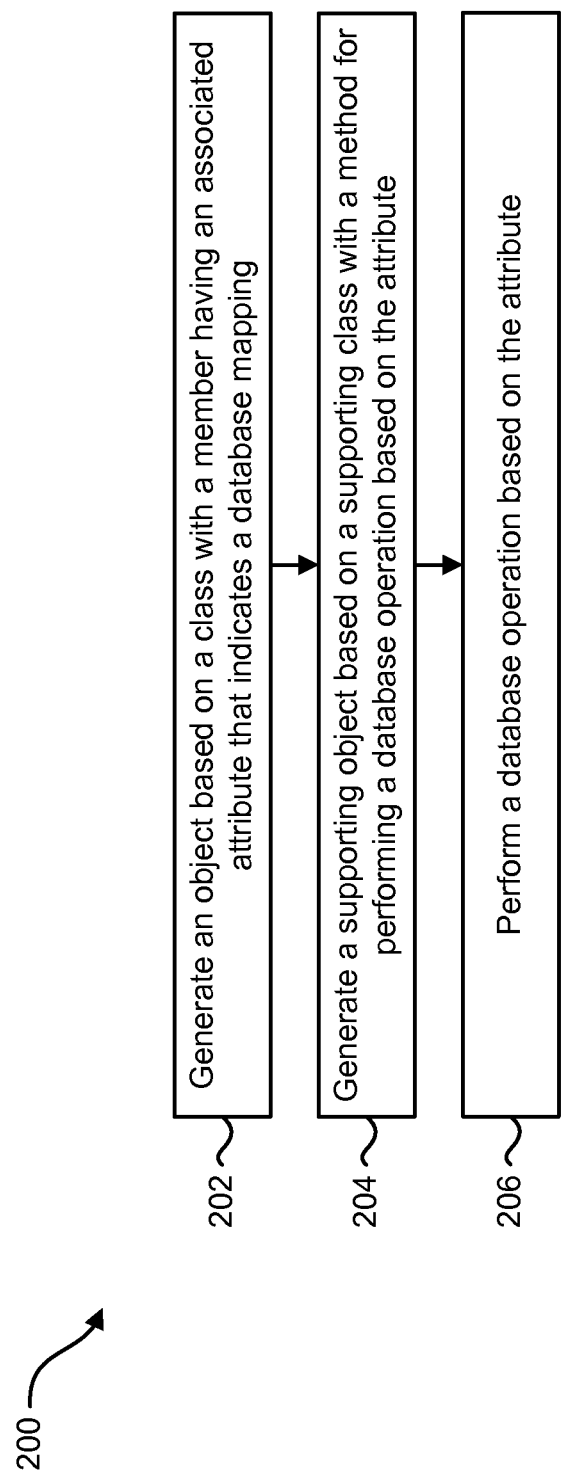
FIG. 2 is a flow diagram illustrating one configuration of a method for using a member attribute to perform a database operation on a computing device.

FIG. 2 is a flow diagram illustrating one configuration of a method 200 for using a member attribute to perform a database operation on a computing device. A computing device 102 may generate 202 an object 128 based on a class 104 with a member 106 having an associated attribute 108 that indicates a database 136 mapping. For example, the computing device 102 may instantiate the class 104 to generate 202 the object 128. In one configuration, the computing device 102 may generate 202 the object 128 by allocating memory for the object 128 and making a usable copy of the class 104 in the allocated memory. This usable copy of the class 104 may be the object 128. The object 128 may include an object member 130 with an associated attribute 134 that respectively correspond to the class 104 member 106 and its associated attribute 108.

The computing device 102 may optionally generate 204 a supporting object based on a supporting class 112 with a method for performing a database 136 operation based on the attribute 108. For example, the computing device 102 may instantiate the supporting class 112 to generate 204 the supporting object. Examples of methods for performing a database 136 operation include save methods 116, load methods 114 and/or conversion methods 124. For instance, the method for performing a database 136 operation may enable the computing device 102 to map, store, load, retrieve, reconstruct and/or transmit the object 128 (e.g., object 128 data or member data 132). In some configurations, the computing device 102 may additionally or alternatively generate a supporting conversion object based on a conversion class 122 with a conversion method 124. The conversion method 124 may be used to convert data types, for example.

The computing device 102 may perform 206 a database operation based on the attribute 108. For example, the computing device 102 may map, store, load, retrieve, reconstruct and/or transmit the object 128 or object 128 data (e.g., member data 132) based on the attribute 134. Several examples of database operations are given as follows. In one example, the computing device 102 may map the object 128 based on the attribute 108. For instance, the computing device 102 may use the object attribute 134 (that is based on the class 104 attribute 108) to map the object 128 member 130 (e.g., associated member data 132) into a database column 138. In some configurations, the attribute 134 indicates a column 138 with a same name as the member 130 identifier. The attribute 134 may additionally or alternatively indicate a column name that is different from the member 130 identifier, other properties of the column (e.g., read-only, etc.), a table name and/or primary key identifier, etc.

In another example, the computing device 102 may store the object 128 or object data (e.g., member data 132) based on the attribute 108. For example, the attribute 134 may indicate where member data 132 should be written to in a database 136. For instance, the computing device 102 may write member data 132 to a particular memory address corresponding to a database column 138 indicated by the attribute 134. Additionally or alternatively, the computing device 102 may generate a database 136 (e.g., table) based on the attribute 134.

In another example, the computing device 102 may load or retrieve the object 128 or object 128 data (e.g., member data 132) based on the attribute 108. For example, the computing device 102 may retrieve member data 132 that has been stored in a database 136 based on the attribute 134. For instance, the database column 138 may indicate which object attribute 134 (and hence object member 130) the data corresponds to. In some configurations, this may be used to reconstruct the object 128.

In another example, the computing device 102 may reconstruct the object 128 based on the attribute 134. As described above, the structure (e.g., column, row, etc.) of data in the database 136 may indicate which object attribute 134 (and object member 130) the data corresponds to. In some cases, the computing device 102 may load the database 136 data into the same or a different object 128 in order to reconstruct the object 128. For example, the computing device 102 may set properties or fields of members 130 (and/or attributes 134) in an object 128 in order to reproduce an object 128 that was stored in the database 136.

In another example, the computing device 102 may transmit the object 128 or object data (e.g., member data 132) based on the attribute 108. In one configuration, the computing device 102 may generate a message based on the attribute 134 that may be sent to another device. For instance, member data 132 may be written to an XML database (e.g., table) column 138 as indicated by the attribute 134. This XML database 136 (e.g., table) may then be transmitted to another device (using a network, for example).

It should be noted that the steps illustrated in the method 200 may be performed for one or more objects 128 with one or more members 130. For example, multiple objects 128 may be generated 202 and multiple database operations may be performed 206 based on multiple attributes 108 (and/or object attributes 134). It should be noted that when a particular operation or structure is based on a class attribute 108, it may additionally or alternatively be based on a corresponding object 128 attribute 134.

Figure 3:
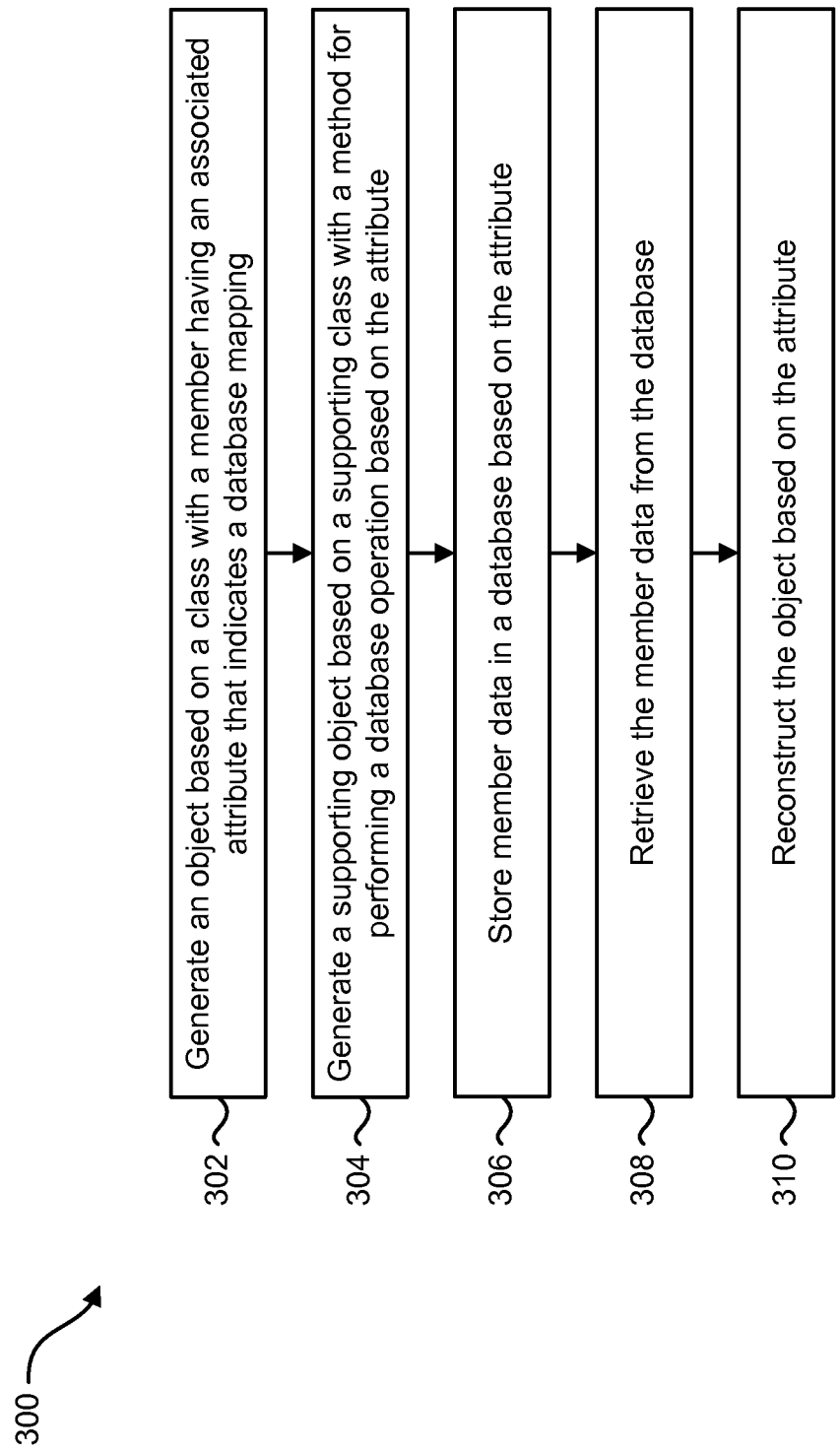
FIG. 3 is a flow diagram illustrating a more specific configuration of a method for using a member attribute to perform a database operation on a computing device.

FIG. 3 is a flow diagram illustrating a more specific configuration of a method 300 for using a member attribute to perform a database operation on a computing device. A computing device 102 may generate 302 an object 128 based on a class 104 with a member 106 having an associated attribute 108 that indicates a database 136 mapping. For example, the computing device 102 may instantiate the class 104 to generate 302 the object 128. In one configuration, the computing device 102 may generate 302 the object 128 by allocating memory for the object 128 and making a usable copy of the class 104 in the allocated memory. This usable copy of the class 104 may be the object 128. The object 128 may include an object member 130 with an associated attribute 134 that respectively correspond to the class 104 member 106 and its associated attribute 108.

The computing device 102 may optionally generate 304 a supporting object based on a supporting class 112 with a method for performing a database 136 operation based on the attribute 108. For example, the computing device 102 may instantiate the supporting class 112 to generate 304 the supporting object. Examples of methods for performing a database 136 operation include save methods 116, load methods 114 and/or conversion methods 124. For instance, the method for performing a database 136 operation may enable the computing device 102 to map, store, load, retrieve, reconstruct and/or transmit the object 128.

The computing device 102 may store 306 the member data 132 in a database 136 based on the attribute 108. For example, the attribute 134 may indicate where member data 132 should be written to in a database 136. For instance, the computing device 102 may write member data 132 to a particular memory address corresponding to a database column 138 indicated by the attribute 134. Additionally or alternatively, the computing device 102 may generate a database 136 (e.g., table) based on the attribute 134.

In one configuration, the attribute 134 may be used to store 306 member data 132 as follows. For example, the attribute 108 may indicate to the computing device 102 that an identifier of its associated member 106 should be used as a column 138 name in a database 136. For instance, if "[EColumn]" is placed above "public int MyInt;" in programming code (where "MyInt" is a member 106 identifier), the computing device 102 may use "MyInt" as a column 138 name for the column 138 in which member data 132 is stored.

In another configuration, the attribute 108 may specify a column 138 name. As illustrated in Listing (6) above, "[EColumn("MyEnumInstanceDifferentName")]" is placed above "public MyEnum MyEnumInstance=MyEnum.MyEnum1;" in programming code. In this case, the computing device 102 may use a database column 138 named "MyEnumInstanceDifferentName" to store 306 member data 132. Additionally or alternatively, the attribute 108 may specify a particular kind of behavior for a database column 138. For example, "[EColumn(true)]" placed before "public int MyForeignKeyReference;" may indicate that the column 138 where member data 132 is stored 306 is read-only. In this way, the computing device 102 may store 306 member data 132 based on an attribute 108.

The computing device 102 may load or retrieve 308 the member data 132 based on the attribute 108. For example, the computing device 102 may retrieve 308 member data 132 that has been stored in a database 136 based on the attribute 134. For instance, the database column 138 may indicate which object attribute 134 (and hence object member 130) the data corresponds to. In some configurations, this may be used to reconstruct the object 128.

The computing device 102 may reconstruct 310 the object 128 based on the attribute 108. As described above, the structure (e.g., column, row, etc.) of the data in the database 136 may indicate which object attribute 134 (and object member 130) the data corresponds to. In some cases, the computing device 102 may load the database 136 data into the same or a different object 128 in order to reconstruct the object 128. For example, the computing device 102 may set properties or fields of members 130 (and/or attributes 134) in an object 128 in order to reproduce an object 128 that was stored in the database 136.

In one configuration, the computing device 102 may read column 138 names in the database 136 in order to determine which data in the database 136 corresponds to which member 130 in an object 128. For example, assume that object 128 data (e.g., member data 132) has been stored in the database 136 and the original object 128 has been disposed of. The computing device 102 may generate a new object 128 based on the class 104. The computing device 102 may then retrieve 308 data from each column 138a-n and set the value of each member 130 (with an attribute 134) in the new object 128 equal to the data from each database column 138 (in a row 140, for example). In order to accomplish this, the computing device 102 may match column 138 names to object attributes 134 or member 130 identifiers with attributes 134. In this way, member data 132 may be retrieved 308 and placed with members 130 (whose associated attributes 134 or member 130 identifiers match the column 138 names), thereby reconstructing 310 the object 128 based on one or more attributes 108. It should be noted that the steps illustrated in the method 300 may be performed for multiple classes, objects, members and/or databases.

Figure 4:
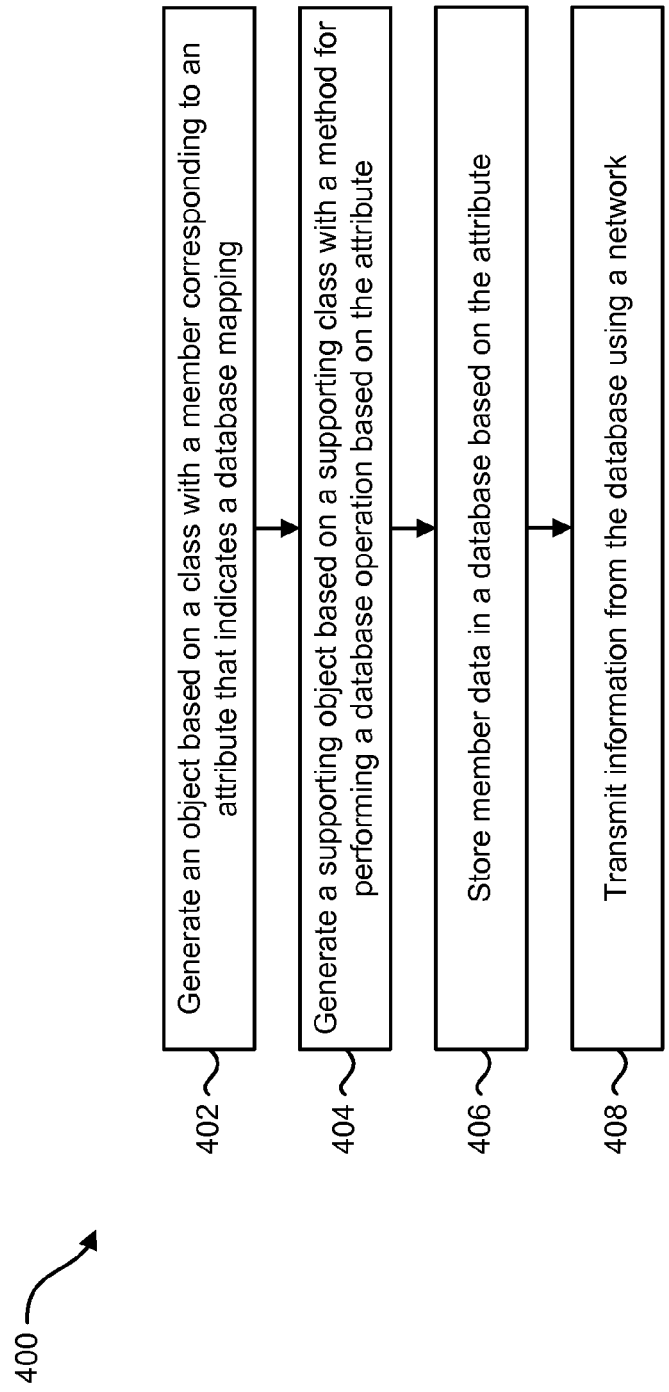
FIG. 4 is a flow diagram illustrating a more specific configuration of a method for using a member attribute to perform a database operation on a computing device.

FIG. 4 is a flow diagram illustrating a more specific configuration of a method 400 for using a member attribute to perform a database operation on a computing device. A computing device 102 may generate 402 an object 128 based on a class 104 with a member 106 having an associated attribute 108 that indicates a database 136 mapping. For example, the computing device 102 may instantiate the class 104 to generate 402 the object 128. In one configuration, the computing device 102 may generate 402 the object 128 by allocating memory for the object 128 and making a usable copy of the class 104 in the allocated memory. This usable copy of the class 104 may be the object 128. The object 128 may include an object member 130 with an associated attribute 134 that respectively correspond to the class 104 member 106 and its associated attribute 108.

The computing device 102 may optionally generate 404 a supporting object based on a supporting class 112 with a method for performing a database 136 operation based on the attribute 108. For example, the computing device 102 may instantiate the supporting class 112 to generate 404 the supporting object. Examples of methods for performing a database 136 operation include save methods 116, load methods 114 and/or conversion methods 124. For instance, the method for performing a database 136 operation may enable the computing device 102 to map, store, retrieve, reconstruct and/or transmit the object 128.

The computing device 102 may store 406 the member data 132 in a database 136 based on the attribute 108. For example, the attribute 134 may indicate where member data 132 should be written to in a database 136. For instance, the computing device 102 may write member data 132 to a particular memory address corresponding to a database column 138 indicated by the attribute 108. Additionally or alternatively, the computing device 102 may generate a database 136 (e.g., table) based on the attribute 108.

In one configuration, the attribute 108 may be used to store 406 member data 132 as follows. For example, the attribute 134 may indicate to the computing device 102 that an identifier of its associated member 106 should be used as a column 138 name in a database 136. For instance, if "[EColumn]" is placed above "public int MyInt;" in programming code (where "MyInt" is a member 106 identifier), the computing device 102 may use "MyInt" as a column 138 name for the column 138 in which member data 132 is stored.

In another configuration, the attribute 108 may specify a column 138 name. As illustrated in Listing (6) above, "[EColumn("MyEnumInstanceDifferentName")]" is placed above "public MyEnum MyEnumInstance=MyEnum.MyEnum1;" in programming code. In this case, the computing device 102 may use a database column 138 named "MyEnumInstanceDifferent-Name" to store 406 member data 132. Additionally or alternatively, the attribute 108 may specify a particular kind of behavior for a database column 138. For example, "[EColumn(true)]" placed before "public int MyForeign-KeyReference;" may indicate that the column 138 where member data 132 is stored 406 is read-only. In this way, the computing device 102 may store 406 member data 132 based on an attribute 108.

The computing device 102 may transmit 408 information from the database 136 (e.g., object 128 data, member data 132, etc.) based on the attribute 108. In one configuration, the computing device 102 may generate a message based on the attribute 134 that may be sent to another device. For instance, member data 132 may be written to an XML database (e.g., table) column 138 as indicated by the attribute 108. This XML database 136 (e.g., table) may then be transmitted to another device (using a network, for example).

Figure 5:
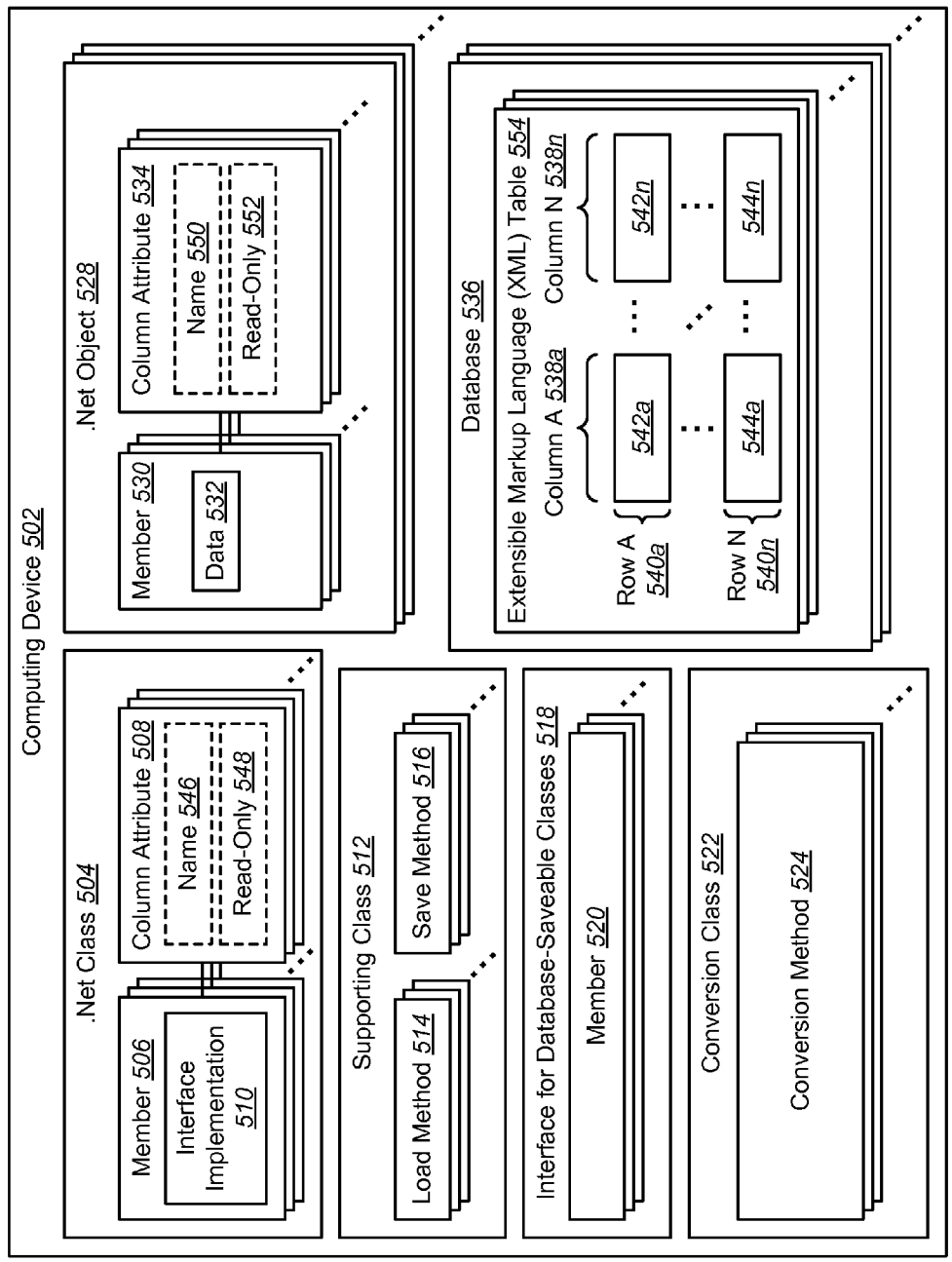
FIG. 5 is a block diagram illustrating a more specific configuration of a computing device in which systems and methods for using a member attribute to perform a database operation may be implemented.

FIG. 5 is a block diagram illustrating a more specific configuration of a computing device 502 in which systems and methods for using a member attribute to perform a database operation may be implemented. Examples of the computing device 502 include desktop computers, laptop computers, servers, smart phones, tablet devices, game consoles, supercomputers and/or other devices with a processor and memory. The computing device 502 may include a .NET class 504, one or more .NET objects 528 and one or more databases 536. The computing device 502 may optionally include a supporting class 512, an interface 518 for database-saveable classes and/or a conversion class 522.

The .NET class 504 may be a programmatic class in accordance with the MICROSOFT .NET software framework comprising instructions, code and/or data. The MICROSOFT .NET software framework supports several programming languages such as C++, C#, JAVA AND VISUAL BASIC. In one example, the .NET class 504 may include computer instructions and/or data that may be used to generate an instance (e.g., .NET object 528) of the .NET class 504. One example of a .NET class 504 is illustrated in Listing (3) above.

The .NET class 504 may include one or more members 506 and one or more column attributes 508. Examples of .NET class members 506 may include fields, properties, variables, methods, functions, operations, etc. In the example illustrated in Listing (3) above, members 506 of the "MyClass" class include "MyEnum," "MyInt," "MyString," "MyForeignKeyReference," "NotInTheDatabase" (string), and "NotInTheDatabase" (int). As can be observed, some of the member 506 types in Listing (3) include an "enum" or enumerated type, an "int" or integer type and a "string" type. Other member 506 types may be used.

In some configurations, a member 506 may implement an interface 518 for database-saveable classes or include an interface implementation 510. As illustrated in FIG. 5, for instance, an interface 518 for database-saveable classes may include one or more members 520. Each of the interface members 520 may be a member definition or declaration, such as a definition or declaration of a field, property, method, function, operation, etc. One example of an interface 518 for database-saveable classes is illustrated in Listing (7) above. In that example, the interface 518 for database-saveable classes "DBSaveable" has several members 520 (e.g., declarations) including "ID," "TableName," "IDColumnName" and "OnLoadFromDB."

In the case that a .NET class member 506 includes an interface implementation 510, that .NET class member 506 may include code, instructions and/or data that provide functionality and/or value(s) for a declared or defined interface member 520. Listing (5) above illustrates one example of an interface implementation 510 for the "DBSaveable" interface 518 illustrated in Listing (7). As can be observed, Listing (5) includes code or instructions for the "ID," "TableName," "IDColumnName" and "OnLoadFromDB" interface members 520 illustrated in Listing (7). It should be noted that using an interface 518 for database-saveable classes may only be a possible configuration of the systems and methods disclosed herein. Alternatively, no interface 518 for database-saveable classes may be used.

The one or more column attributes 508 may comprise data or information (e.g., metadata) that can be associated with a member 506. More specifically, a column attribute 508 may include data or information associated with a member 506. The one or more column attributes 508 may be "Attributes" as specified by the .NET framework. According to the systems and methods disclosed herein, each column attribute 508 may indicate a database 536 mapping. More specifically, each column attribute 508 indicates a column 538 in a database 536 (and/or database table 554). One or more of the column attributes 508 may optionally include additional information, such as a column name 546 (that is different from a member 506 identifier, for example) and/or other characteristics such as a read-only characteristic 548.

One example of how column attributes 508 may be associated with members 506 is illustrated in Listing (6) above. Listing (6) illustrates that a column attribute 508 called "EColumn" may be associated with .NET class members 506. More specifically, an "EColumn" attribute 508 is associated the "MyInt" member 506, an "EColumn("MyEnumInstanceDifferentName")" is associated with the "MyEnumInstance" member 506, an "EColumn" attribute 508 is associated with the "MyString" member 506 and an "EColumn(true)" attribute 508 is associated with the "MyForeignKeyReference" member 506. As illustrated in Listing (6), an attribute may be used by placing an identifier in square brackets (e.g., In before a member 506 declaration or definition. This may be an instruction for a compiler to associate an attribute with a member and/or add metadata to the member. For example, placing "[EColumn]" before "public int MyInt;" is an instruction for a compiler to associate a column attribute 508 with the "MyInt" member 506.

As illustrated in Listing (6), different variations of column attributes 508 may be used. For example, "[EColumn]" may indicate a column attribute 508, where the member 506 identifier (e.g., "MyInt") will be used as a column 538 name in a database 536. "[EColumn("DifferentName")]" may indicate a column attribute 508, where a "DifferentName" string will be used as a column 538 name in a database 536. For example, a column attribute 508 name 546 may be optionally specified. "[EColumn(Boolean)]" may indicate a column attribute 508, where "Boolean" indicates whether a column 538 in a database 536 is read-only or not. For example, a column attribute 508 read-only characteristic 548 may be optionally specified. Furthermore, "[EColumn("DifferentName", Boolean)]" may indicate a column attribute 508, where a "DifferentName" string will be used as a column 538 name in a database 536 and where "Boolean" indicates whether a column 538 is read-only or not. For example, both a column attribute 508 name 546 and a read-only characteristic 548 may be optionally specified.

The computing device 502 may generate one or more instances of the .NET class 504. A .NET class 504 instance may be referred to herein as a .NET object 528. In other words, a computing device 502 may generate a .NET object 528 by instantiating the .NET class 504. As illustrated in FIG. 5, the computing device 502 may generate one or more .NET objects 528 based on the .NET class 504. In one configuration, the computing device 502 may generate a .NET object 528 by making a copy of the .NET class 504 in a portion of memory.

Each .NET object 528 may include one or more members 530 and one or more column attributes 534. The one or more .NET object members 530 may correspond to the one or more .NET class members 506 and the one or more .NET object column attributes 534 may correspond to one or more column attributes 508 from the .NET class 504. Each .NET object member 530 may include data 532. The data 532 may be information corresponding to the .NET object member 530. For instance, data 532 may include field, property and/or variable information and/or information corresponding to a method, function and/or operation. For example, the "MyInt" member 530 illustrated in Listing (3) may be set to a particular integer value such as 1, 2, 3, etc., and the "MyString" member 530 may be set to the value "my string" as illustrated in Listing (3).

Each column attribute 534 may indicate a mapping of a .NET object member 530 to a database column 538. For example, the computing device 502 may map member data 532 into a database column 538 indicated by the member's 530 associated column attribute 534. In one configuration, the computing device 502 maps each member's 530 data 532 to a database column 538a-n (based on each column attribute 534) and maps each .NET object 528 (e.g., each member's 530 data 532 of each .NET object 528) to a different database row 540a-n. For example, the computing device 502 may map each member's 530 data 532 of a first .NET object 528 to columns A-N 538a-n of row A 540a (e.g., cells 542a-n) and so on up to each member's 530 data 532 of a last .NET object 528 to columns A-N 538a-n of row N 540n (e.g., cells 544a-n). The computing device 502 may perform a database 536 operation that involves one or more .NET objects 528. For instance, the phrase "database operation" as used herein may include one or more of mapping, storing, loading, retrieving, reconstructing and/or transmitting .NET objects 528. In some configurations, a column attribute 534 may include a name 550 and/or other properties (e.g., a read-only characteristic 552). The name 550 may specify a name for a column 538 that the member 530 is mapped to. The read-only property 552 may indicate that the corresponding column 538 may be read-only (e.g., not to be written to when a .NET class 504 or .NET object 528 is serialized back to the database 536).

The use of the read-only property may be illustrated with the following example. In this example, two database 536 tables 554 (which may or may not be XML tables) may be joined. For instance, a first table may be used in order to reconstruct an object (e.g., .NET object 528). However, this first table 554 may be joined to a second table 554 in order to retrieve data for the object reconstruction. In one configuration, if the data or value is coming from the second table 554 that was joined with the first table in order to get the value, then marking the corresponding column attribute 534 as read-only may be required so that a save method 516 does not add a column 538 to a list of columns 538 to update for the first table 554. For instance, assume that a (primary) table called "Task" is being used to reconstruct an object (e.g., a .NET object 528). Further assume that each task (in the Task table, for example) has an "OwnerID" that comes from a (secondary) "ConsoleUser" table. The Task table may be joined with the ConsoleUser table in order to perform an "owner=ConsoleUser_Idn" comparison. Assume that a "Username" field is desired as an attribute of a task property in the object, even though the corresponding value or data comes from a column in the ConsoleUser table. Accordingly, the attribute may be denoted [EColumn("ConsoleUser.Username", true)], which indicates that this attribute is read-only. Additionally or alternatively, read-only status may be implied if there is a "dot" in the column name. This may be because the dot (e.g., ".") implies that an alternate table or table alias may be needed to be specified to get at the column value. Thus, in the case of a read-only column indicated by a column attribute, the computing device 502 may not create a new column when writing a task property back to the database.

The computing device 502 may optionally include a supporting class 512. The supporting class 512 may include one or more load methods 514 and/or one or more save methods 516. Additionally or alternatively, the supporting class 512 may include one or more conversion methods 524 (instead of or in addition to a separate conversion class 522). The one or more save methods 516 may be used to store one or more .NET objects 528 to one or more databases 536 (and/or database tables 554). For example, a save method 516 may include instructions used to write member 530 data 532 into the database 536. Additionally or alternatively, a save method 516 may be used to create a database 536 and/or database tables 554 for storing member data 532. The one or more load methods 514 may be used to retrieve information from the one or more databases 536. For example, a load method 514 may be used to retrieve information from the database 536 that is used to reconstruct a .NET object 528 that has been stored in the database 536. For instance, the computing device 502 may use one or more load methods 514 and/or one or more save methods 516 for storing, retrieving, transmitting and/or converting .NET objects 528. It should be noted that the supporting class 512 is optional. In other configurations, save and/or load functionality or instructions (e.g., one or more save methods 516 and/or one or more load methods 514) may be implemented as part of the .NET class 504 and/or received from another device. Some examples of load methods 514 and save methods 516 are illustrated in Listing (1) above.

The computing device 502 may optionally include a conversion class 522. The conversion class 522 may include one or more conversion methods 524. The one or more conversion methods 524 may be used to convert a .NET object 528 data type into a data type that is compatible with one or more databases 536. In one example, a .NET object 528 may have a member 530 including a particular data type (e.g., .NET data type). One or more conversion methods 524 may be used to convert the member data 532, such as a string, character (e.g., "char" type), floating point number (e.g., "float" type) or a double-precision number (e.g., "double" type), etc., into a different type (e.g., "long" type) that may be stored in the database 536. It should be noted that .NET types of the same name may be different from certain database 536 data types. In some configurations, a conversion method 524 may be used to convert data between databases, such as data stored in an SQL database 536 into a format compatible with a Microsoft Access database 536 or an Oracle database 536, for example.

As noted above, the one or more conversion methods 524 may be included in a supporting class 512 instead of or in additional to the conversion class 522. In yet another configuration, one or more load methods 514, one or more save methods 516 and/or one or more conversion methods 524 may be included in the .NET class 504. Additionally or alternatively, instructions with functionality equivalent to the one or more load methods 514, one or more save methods 516 and/or one or more conversion methods 524 may be received from another device to perform the corresponding operations described above.

As illustrated in FIG. 5, the one or more databases 536 may include one or more Extensible Markup Language (XML) tables 554. An XML table 554 may include one or more columns 538a-n and one or more rows 540a-n. In some configurations, the computing device 502 may store one or more .NET objects 528 in one or more XML tables 554 in one or more databases 536. One example of an XML table 554 is illustrated in Listing (4) above. In some configurations, an XML table 554 may be sent to another device. This may be done using a network, such as a Local Area Network (LAN), the Internet, etc.

Figure 6:
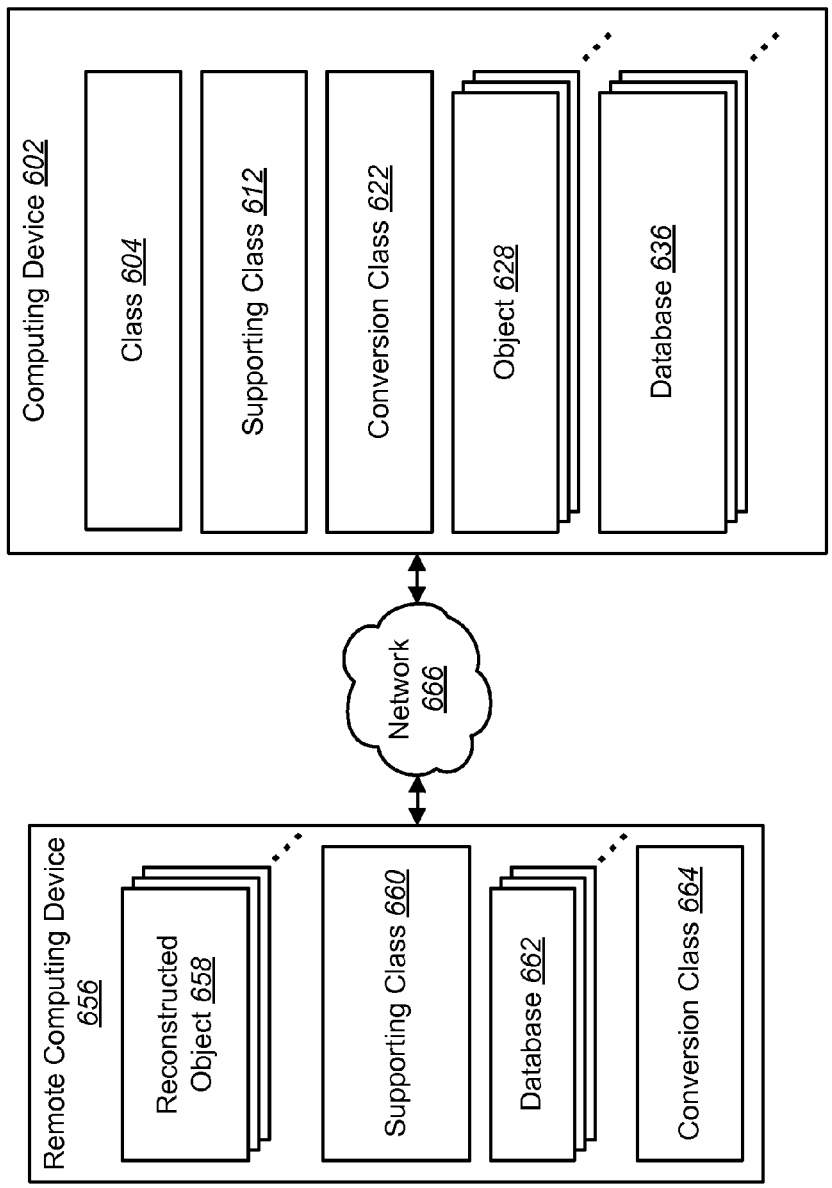
FIG. 6 is a block diagram illustrating one configuration of a remote computing device communicating with a computing device that may use a member attribute to perform a database operation.

FIG. 6 is a block diagram illustrating one configuration of a remote computing device 656 communicating with a computing device 602 that may use a member attribute to perform a database operation. The computing device 602 may include a class 604, one or more objects 628 and one or more databases 636. The computing device 602 may optionally include a supporting class 612 and/or a conversion class 622. The computing device 602 illustrated in FIG. 6 may be configured similarly to the computing device 102 illustrated in FIG. 1 and/or the computing device 502 illustrated in FIG. 5.

The computing device 602 may be connected to a network 666. Examples of the network 666 include a Local Area Network (LAN), Wide Area Network (WAN), the Internet, etc. The network 666 may be implemented using wired and/or wireless technology. For example, the network 666 may be implemented using one or more wired routers, switches and/or hubs, etc. Additionally or alternatively, the network 666 may be implemented using wireless routers, base stations, access terminals, etc.

The network 666 may also be connected to a remote computing device 656. Examples of the remote computing device 656 include desktop computers, laptop computers, servers, smart phones, tablet devices, game consoles, supercomputers and/or other devices with a processor and memory.

The computing device 602 may transmit information to the remote computing device 656 using the network 666. For example, the computing device 602 may generate one or more objects 628 based on a class 604 with a member having an associated attribute that indicates a database 636 mapping. The computing device 602 may store the one or more objects 628 (e.g., member data) in the one or more databases 636. The computing device 602 may transmit information to the remote computing device 656 based on the information stored in the one or more databases 636. For example, the computing device 602 may transmit object 628 data (e.g., member data) that has been stored in the database 636 to the remote computing device 656. In one configuration, the one or more databases 636 comprise one or more XML tables similar to the example illustrated in Listing (4). For instance, the computing device 602 may transmit the one or more XML tables including object 628 information (e.g., member data) to the remote computing device 656.

The remote computing device 656 may receive the information from the computing device 602. In one configuration, the remote computing device 656 may generate one or more reconstructed objects 658 based on the information received. The one or more reconstructed objects 658 may be based on information corresponding to one or more original objects 628 generated on the computing device 602.

The remote computing device 656 may optionally include a supporting class 660 and/or a conversion class 664. The supporting class 660 may be configured similarly to the supporting classes 112, 512, 612 described above. For example, the supporting class 660 may include one or more save and/or load methods that may be used to generate the one or more reconstructed objects 658 based on the received information. The conversion class 664 may be configured similarly to the conversion classes 122, 522, 622 described above. The conversion class 664 may include one or more conversion methods that may be used to generate the one or more reconstructed objects 658. For example, the conversion class 664 may be used to convert database types (either from a computing device database 636 or a remote computing device database 662) in order to set values in a reconstructed object 658 according to an original object 628 on the computing device 602.

Additionally or alternatively, the remote computing device 656 may store received information in one or more remote computing device databases 662. For example, the remote computing device 656 may store object information (e.g., member data) in one or more databases 662 based on the information received from the computing device 602. In one configuration, the remote computing device 656 may save a copy of the database 636 information received. Additionally or alternatively, the remote computing device 656 may convert one or more data types of the information received in order to store the information in a database 662. This may optionally be done using the conversion class 664.

In one configuration, the remote computing device 656 may generate the one or more reconstructed objects 658 based on the information received and stored in its one or more databases 662. Additionally or alternatively, the remote computing device 656 may first generate one or more reconstructed objects 658 based on the received information, and then store the reconstructed objects 658 (e.g., member data) in the one or more remote computing device databases 662.

The systems and methods disclosed herein may be useful because they may be applied to existing objects in a system. However, those objects may need to derive from a particular interface (e.g., the "DBSaveable" interface). The members (e.g., fields and/or properties) may be tagged by using an attribute in individual classes that are desired to be loaded and saved to the database. By doing this, other loading/saving code may be eliminated.

In one configuration, examples of objects that may be used in accordance with the systems and methods disclosed herein include "Task", "Distribution Package", "Vulnerability definition", "Query", "User" and "Computer" objects, etc. In one example, where the systems and methods disclosed herein were not used, some of these objects were "exportable." However, in that case, the "exportable" objects came from a higher-level "DBSaveable" class that also supported serializing to/from a file system or over a network to another computing device. However, when the systems and methods disclosed herein were used (by implementing a DBSaveable interface, for example), each of these objects did not have to change very much in order to become Object Relational Mapping-style (ORM-style) objects and take advantage of a common load/save mechanism, which greatly simplifies the code. In contrast, a typical ORM scheme requires generating the code from a database schema, which may not allow much freedom to implement objects in a desired fashion.

Figure 7:
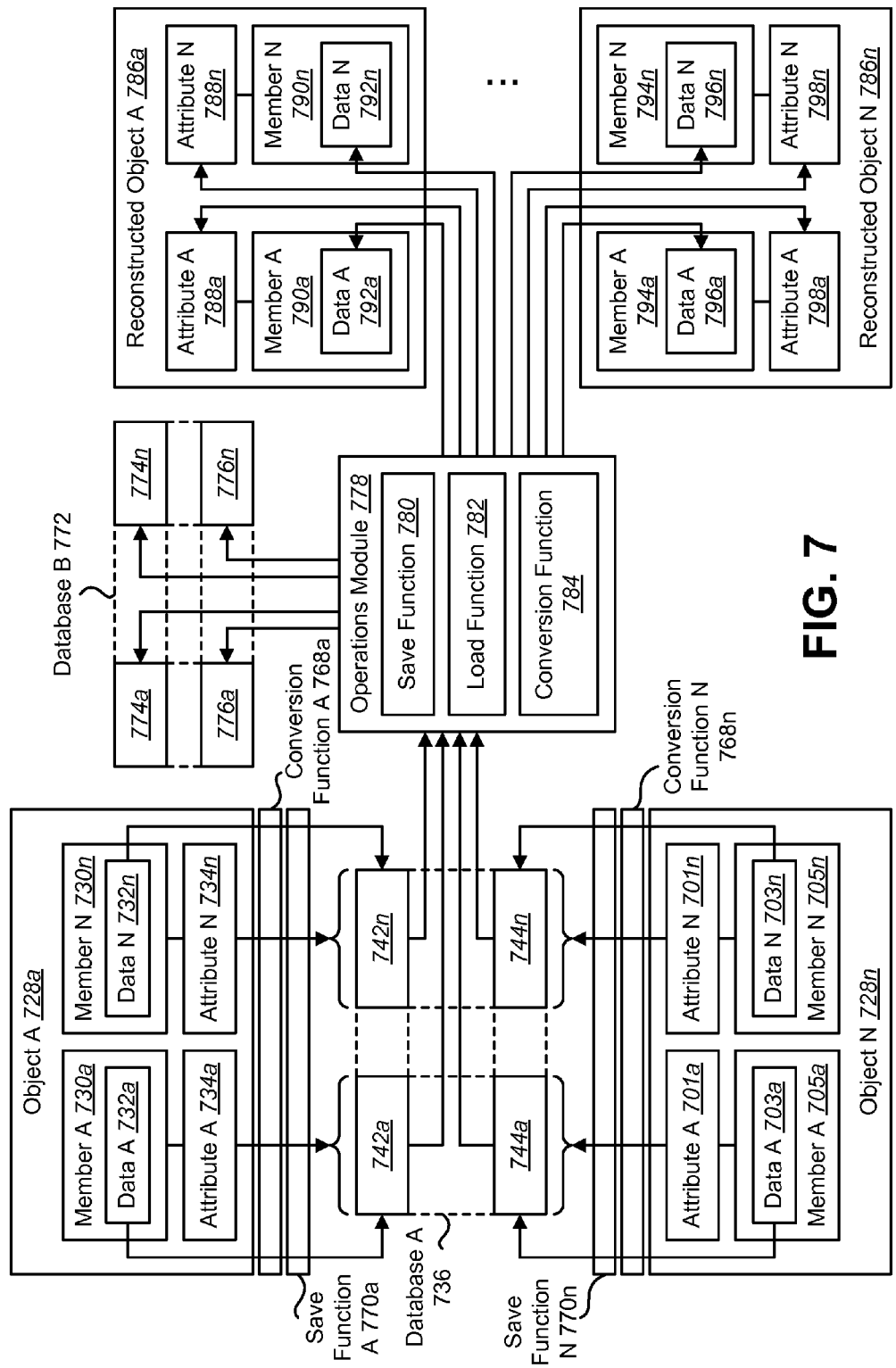
FIG. 7 is a block diagram illustrating one example of using a member attribute to perform a database operation on a computing device.

FIG. 7 is a block diagram illustrating one example of using a member attribute to perform a database operation on a computing device. A computing device may generate one or more objects 728*a-n* based on a class with a member having an associated attribute that indicates a database 736 mapping. As illustrated in FIG. 7, each of these objects 728*a-n* that are generated based on the class may include one or more members 730*a-n*, 705*a-n* (each including data 732*a-n*, 703*a-n*) and one or more associated attributes 734*a-n*, 701*a-n*. More specifically, object A 728*a* includes members A-N 730*a-n* that each include respective data A-N 732*a-n* and are associated with respective attributes A-N 734*a-n*. Additional objects 728 may similarly include members with data and associated attributes up to object N 728*n*, which includes members A-N 705*a-n* that each include respective data A-N 703*a-n* and are associated with respective attributes A-N 701*a-n*.

A computing device may map the objects 728*a-n* (e.g., member data 732) to database A 736 based on attributes. For example, attributes A 734*a*, 701*a* may indicate a first database A 736 column. Additional attributes 734, 701 may indicate other database A 736 columns up to attributes N 734*n*, 701*n*, which may indicate a last database A 736 column. Each object 728*a-n* may be mapped to a different database A 736 row. For example, member data 732 from object A 728*a* may be mapped to a first database A 736 row.

Additional member data from other objects 728 may be mapped to other database A 736 rows, up to member data 703 from object N 728*n* being mapped to a last database A 736 row. As illustrated, this mapping may result in data A 732*a* from object A 728*a* being mapped to a cell 742*a* in the first column and first row of database A 736 through data N 732*n* from object A 728*a* being mapped to a cell 742*n* in the last column and first row of database A 736. Other object 728 data may be similarly mapped to other cells of database A 736 up to data A 703*a* from object N 728*n* being mapped to a cell 744*a* in the first column and last row of database A 736 through data N 703*n* from object N 728*n* being mapped to a cell 744*n* in the last column and last row of database A 736.

The computing device may optionally convert the object 728*a-n* data and save the object 728*a-n* data in database A 736. As illustrated, the computing device may optionally use one or more conversion functions 768*a-n* and may use one or more save functions 770*a-n*. It should be noted that the conversion functions 768*a-n* that are illustrated separately in FIG. 7 for convenience may be a single conversion function 768. Similarly, the save functions 770*a-n* that are illustrated separately in FIG. 7 for convenience may be a single save function 770.

The one or more conversion functions 768*a-n* may convert one or more object 728*a-n* data types into data types suitable for storage in database A 736. For example, some data types of information that are desired to be written to database A 736 may include an integer, a float, a Boolean, and/or an enumeration, etc. However, database A 736 may need to store information (of any originating data type) as a single data type (e.g., "long") in database A 736. The one or more conversion functions 768*a-n*, 784 may handle data type conversion to and/or from database A 736. In some configurations, the conversion may be done in conjunction with one or more save functions 770*a-n*, 780 and/or load functions 782. Thus, the systems and methods disclosed herein may offer data type conversion functionality (as a typical Object Relational Mapping (ORM) scheme may offer), though the systems and methods disclosed may be more flexible than typical ORM schemes.

The one or more save functions 770 may store object 728*a-n* data in database A 736. Storing the object 728*a-n* data in database A 736 may include generating database A 736, generating and/or naming database A 736 columns and/or rows, setting properties or characteristics of database A 736 columns and/or writing member data to database A 736 based on attributes (e.g., attributes A-N 734*a-n*). As described above, the columns may be named based on the attributes. For example, the computing device may name each database A 736 column according to a member 730*a-n* identifier if its corresponding attribute 734*a-n* does not specify a name. Alternatively, the computing device may name each database A 736 column according to each attribute 734*a-n* that specifies a name.

Database A 736 column properties may optionally be set based on the attributes 734*a-n*. For example, the computing device may set properties for each database A 736 column as specified by a corresponding attribute 734*a-n*. In one configuration, an attribute 734 may specify whether its corresponding database A 736 column should be read-only.

The computing device may write object 728 data (e.g., member data A-N 732*a-n*, 703*a-n*, etc.) to database A 736 based on attributes (e.g., attributes A-N 734*a-n*, 701*a-n*, etc.). For example, writing object 728 data according to the mapping described above may result in data A 732*a* from object A 728*a* being written to a cell 742*a* in the first column and first row of database A 736 through data N 732*n* from object A 728*a* being written to a cell 742*n* in the last column and first row of database A 736. Other object 728 data may be similarly written to other cells of database A 736 up to data A 703*a* from object N 728*n* being written to a cell 744*a* in the first column and last row of database A 736 through data N 703*n* from object N 728*n* being written to a cell 744*n* in the last column and last row of database A 736.

In some configurations, further operations may be performed using the information or data stored in database A 736. For example, the same computing device that includes database A 736*a* or a different computing device (e.g., a remote computing device) may include an operations module 778. Some or all of the information stored in database A 736 may be passed or transmitted to this operations module 778. For instance, database A 736 information may be transmitted to another computing device over a network. Additionally or alternatively, database A 736 information may be provided to an operations module 778 on the same computing device.

The operations module 778 may include a save function 780, a load function 782 and/or a conversion function 784. The operations module 778 may use database A 736 information to store the information in another database (e.g., database B 772) and/or to generate one or more reconstructed objects 786*a-n*.

For example, the operations module 778 may store database A 736 information in database B 772. In one configuration, database A 736 information may be mapped directly to corresponding cells in database B 772. More specifically, the contents of the first row of cells 742*a-n* in database A 736 may be mapped directly to (and written to) a corresponding first row of cells 774*a-n* in database B 772 and so on up to the last row of database A 744*a-n* being mapped directly to (and written to) a corresponding last row of database B 776*a-n*. In other configurations, a subset of database A 736 information may be stored in database B 772.

In order to store information from database A 736 into database B 772, the operations module 778 may use its load function 782, save function 780 and/or conversion function 784. For example, the operations module 778 may retrieve information from database A 736 using its load function 782 and may store that information in database B 772 using its save function 780. The load function 782 may retrieve information from database A 736 based on attributes (e.g., attributes A-N 734*a-n*, 701*a-n*, etc.), since database A 736 stores information based on attributes (e.g., since database A 736 is structured based on attributes A-N 734*a-n*, 701*a-n*, etc.). When the load function 782 retrieves information from database A 736, for example, the information may be retrieved based on column names and/or column properties, which may be based directly or indirectly on object 728*a-n* attributes (e.g., attributes A-N 734*a-n*, 701*a-n*, etc.). In some cases, the operations module 778 may only retrieve certain database A 736 columns based on column name and/or properties.

The save function 780 may also store database A 736 information based on attributes (e.g., attributes A-N 734*a-n*, 701*a-n*, etc.). For example, database B 772 columns may be generated, named, assigned properties and/or written to according to database A 736 column names and/or properties that were based on object 728*a-n* attributes.

In some configurations, the conversion function 784 may be used to translate data types from database A 736 to data types that are compatible with database B 772. For example, database A 736 and database B 772 may use different data types and/or encode data differently. Thus, the conversion function 784 may be used to translate data types between database A 736 and database B 772.

The operations module 778 may additionally or alternatively generate one or more reconstructed objects 786*a-n* based on the original objects 728*a-n* (e.g., their attributes). For instance, the operations module 778 may use its load function 782 to retrieve database A 736 information in order to produce reconstructed objects A-N 786*a-n*. It should be noted that one or more reconstructed objects 786 may be generated based on database A 736 information. For example, only a selection of database A 736 rows may be used to generate fewer reconstructed objects 786 than original objects 728.

In one configuration, the load function 782 may generate one or more reconstructed objects 786 that are populated with original object 728*a-n* member data. For example, a computing device may generate reconstructed object A 786*a* and populate its members 790*a-n* with data 792*a-n* retrieved from database A 736. More specifically, the load function 782 retrieves information 742*a-n* and corresponding column names and/or properties from the first row of database A 736. The column names from database A 736 (that were based on one or more of original object A's member attributes 734*a-n*) indicate that member data A-N 792*a-n* correspond to members A-N 790*a-n* with attributes A-N 788*a-n* in reconstructed object A 786*a*. The load function 782 may similarly generate more reconstructed objects 786 up to reconstructed object N 786*n* having members A-N 794*a-n* with data A-N 796*a-n* and associated attributes A-N 798*a-n*.

In one configuration, the computing device may have a class available to generate objects that have the same structure as the original objects 728*a-n*. In this case, the computing device may generate reconstructed objects 786*a-n* and then assign member data (e.g., 792*a-n*, 796*a-n*, etc.) from database A 736. Alternatively, the computing device may generate the reconstructed objects 786*a-n* based solely on the information from database A 736. In some configurations, the conversion function 784 may be used to convert database A 736 data types to reconstructed object 786*a-n* data types.

In one configuration, an object (that may become a reconstructed object 786) may determine which database A 736 data or values map to which attributes (e.g., attributes 788) and members (e.g., members 790*a-n* such as properties) in the object by using the "EColumn" attribute. In one example, where EColumn attributes may be used to include other secondary tables that are joined to the primary table that is being extracting from, join statements may be required to be included in a "SELECT" statement when loading the data. Using the previous "Task" and "ConsoleUser" example above, it may need to be specified how to join the Task table with the ConsoleUser table and what alias to give ConsoleUser when referring to its columns. For example, "ConsoleUser.Username" might be aliased as "cu.UserName". In another configuration, the systems and methods disclosed herein may allow specification of a type of join when identifying the columns. For instance, an SQL statement may be generated such as " . . . from Task t Left Outer Join ConsoleUser cu on t.Owner=cu.ConsoleUser_Idn . . . ".

Figure 8:
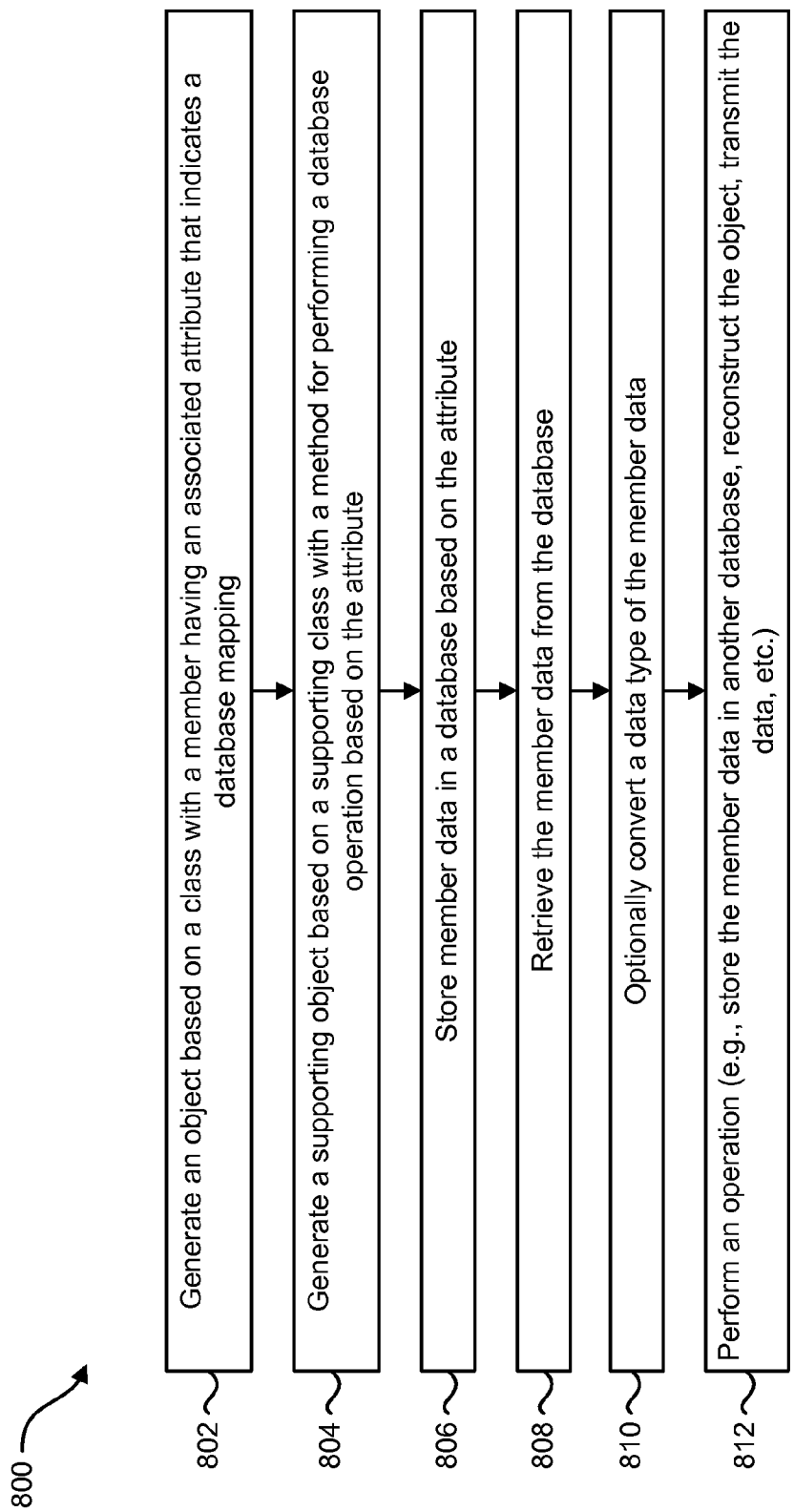
FIG. 8 is a flow diagram illustrating a more specific configuration of a method for using a member attribute to perform a database operation on a computing device.

FIG. 8 is a flow diagram illustrating a more specific configuration of a method 800 for using a member attribute to perform a database operation on a computing device. A computing device 102 may generate 802 an object 128 based on a class 104 with a member 106 having an associated attribute 108 that indicates a database 136 mapping. For example, the computing device 102 may instantiate the class 104 to generate 802 the object 128. In one configuration, the computing device 102 may generate 802 the object 128 by allocating memory for the object 128 and making a usable copy of the class 104 in the allocated memory. This usable copy of the class 104 may be the object 128. The object 128 may include an object member 130 with an associated attribute 134 that respectively correspond to the class 104 member 106 and its associated attribute 108. In some configurations, the class 104 may be a .NET class 504 and the object 128 may be a .NET object 528.

The computing device 102 may optionally generate 804 a supporting object based on a supporting class 112 with a method for performing a database 136 operation based on the attribute 108. For example, the computing device 102 may instantiate the supporting class 112 to generate 804 the supporting object. Examples of methods for performing a database 136 operation include save methods 116, load methods 114 and/or conversion methods 124. For instance, the method for performing a database 136 operation may enable the computing device 102 to map, store, load, retrieve, reconstruct and/or transmit the object 128.

The computing device 102 may store 806 the member data 132 in a database 136 based on the attribute 108. For example, the attribute 134 may indicate where member data 132 should be written to in a database 136. For instance, the computing device 102 may write member data 132 to a particular memory address corresponding to a database column 138 indicated by the attribute 134. Additionally or alternatively, the computing device 102 may generate a database 136 (e.g., table) based on the attribute 134. In one configuration, the computing device 102 may use the attribute 134 to name a database column 138 and/or to set one or more properties of the database column 138.

The computing device 102 may load or retrieve 808 the member data 132 based on the attribute 108. For example, the computing device 102 may retrieve 808 member data 132 that has been stored in a database 136 based on the attribute 134. For instance, the database column 138 may indicate which object attribute 134 (and hence object member 130) the data corresponds to. In some configurations, this may be used to reconstruct the object 128.

The computing device 102 may optionally convert 810 a data type of the member data. Converting 810 a data type may be performed when member data 132 is stored 806 in the database 136 and/or when member data 132 is retrieved 808 from the database 136. For example, the computing device 102 may convert object 128 data types to compatible database 136 data types when the member data 132 is stored 806 in the database 136. Additionally or alternatively, the computing device 102 may convert database 136 data types into data types that are compatible with another database and/or may convert database 136 data types into data types (e.g., object data types) used for a reconstructed object.

The computing device 102 may perform 812 an operation. For example, the computing device 102 may store the member data 132 in another database, reconstruct the object 128 and/or transmit database 136 information.

For example, the computing device 102 may store database 136 information in another database. In one configuration, database 136 information may be mapped directly to corresponding cells in another database. More specifically, the contents of a first row of cells in the database 136 may be mapped directly to (and written to) a corresponding first row of cells in another database and so on up to the last row of the database 136 being mapped directly to (and written to) a corresponding last row of another database. In other configurations, a subset of database 136 information may be stored in another database.

In order to store database 136 information in another database, the computing device 102 may retrieve information from the database 136 and may store that information in another database. In one configuration, a load method 114 may retrieve information from the database 136 based on attributes 108, 134, since the database 136 stores information based on the attributes 108, 134. When the information is retrieved from the database 136, for example, the information may be retrieved based on column names and/or column properties, which may be based directly or indirectly on object 128 attributes 134. In some cases, the computing device 102 may only retrieve certain database 136 columns based on column name and/or properties. In order to store the database 136 information in another database, columns from the other database may be generated, named, assigned properties and/or written to according to database 136 column names and/or properties that were based on object attributes 134. In some configurations, the computing device 102 may convert 810 data types from database 136 to data types that are compatible with the other database. For example, the database 136 and the other database may use different data types and/or encode data differently.

Additionally or alternatively, the computing device 102 may reconstruct the object 128 based on the attribute 108. As described above, the structure (e.g., column, row, etc.) of the data in the database 136 may indicate which object attribute 134 (and object member 130) the data corresponds to. In some cases, the computing device 102 may load the database 136 data into the same or a different object 128 in order to reconstruct the object 128. For example, the computing device 102 may set properties or fields of members 130 (and/or attributes 134) in an object 128 in order to reproduce an object 128 that was stored in the database 136.

In one configuration, the computing device 102 may read column 138 names in the database 136 in order to determine which data in the database 136 corresponds to which member 130 in an object 128. For example, assume that object 128 data (e.g., member data 132) has been stored in the database 136 and the original object 128 has been disposed of. The computing device 102 may generate a new object 128 based on the class 104. The computing device 102 may then retrieve 808 data from each column 138a-n and set the value of each member 130 (with an attribute 134) in the new object 128 equal to the data from each database column 138 (in a row, for example). In order to accomplish this, the computing device 102 may match column 138 names to object attributes 134 or member 130 identifiers with attributes 134. In this way, member data 132 may be retrieved 808 and placed with members 130 (whose associated attributes 134 or member 130 identifiers match the column 138 names), thereby reconstructing the object 128 based on one or more attributes 108. The computing device 102 may optionally convert 810 one or more database 136 data types to data types that are compatible with the reconstructed object(s) 128.

Additionally or alternatively, the computing device 102 may transmit information from the database 136 (e.g., object 128 data, member data 132, etc.) based on the attribute 108. In one configuration, the computing device 102 may generate a message based on the attribute 108 that may be sent to another device. For instance, member data 132 may be written to an XML database (e.g., table) column 138 as indicated by the attribute 108. This XML database 136 (e.g., table) may then be transmitted to another device (using a network, for example).

Figure 9:
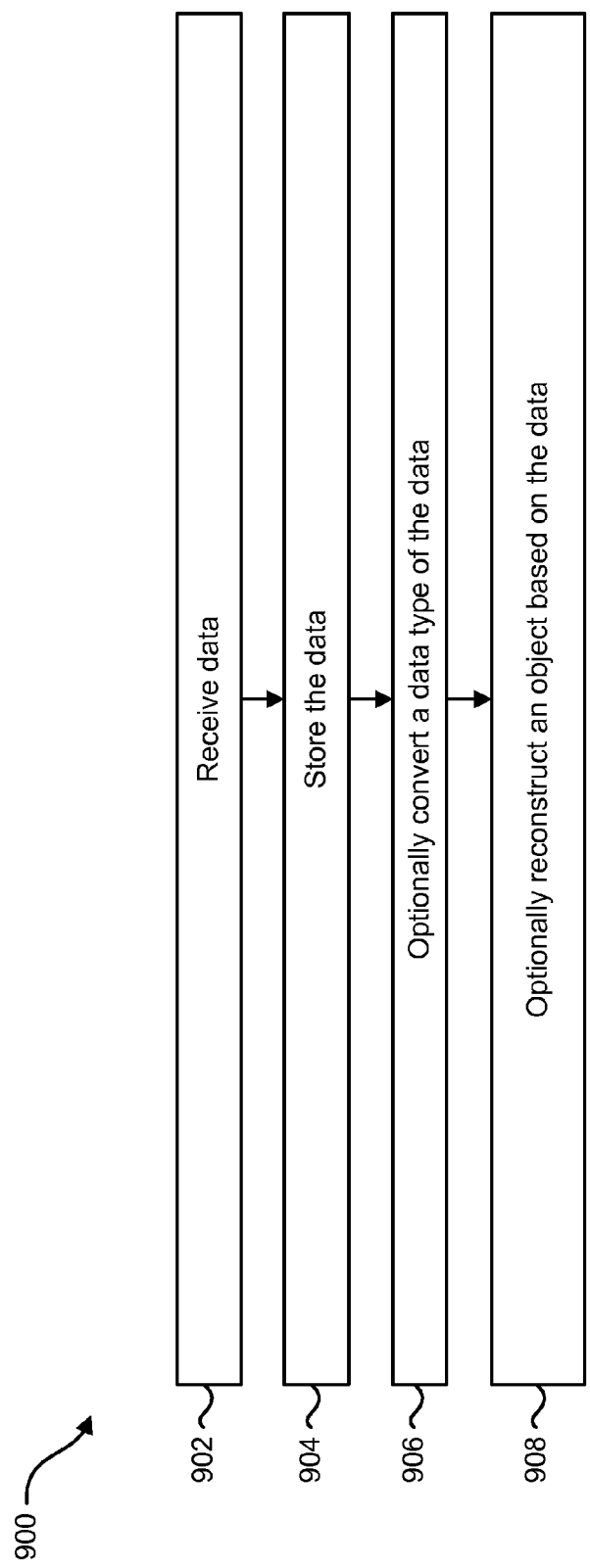
FIG. 9 is a flow diagram illustrating one configuration of a method for using received data.

FIG. 9 is a flow diagram illustrating one configuration of a method 900 for using received data. The method 900 illustrated in FIG. 9 may be used by a remote computing device 656 to store and/or generate a reconstructed object 658 based on received data that was generated using an attribute. A remote computing device 656 may receive 902 data. For example, the remote computing device 656 may receive database 636 information from a computing device 602 that generated the database 636 information based on a class 604 with a member having an associated attribute that indicates a database 636 mapping.

The remote computing device 656 may store 904 the data. For example, the remote computing device 656 may store 904 the data in the format in which it was received. In some cases, the remote computing device 656 may receive 902 a copy of the database 636, which it 656 may store 904.

Additionally or alternatively, the remote computing device 656 may store 904 the received 902 data in a database 662. In one configuration, the received 902 data or information may be mapped directly to corresponding cells in a database 662. More specifically, the contents of a first row of cells from the computing device 602 database 636 may be mapped directly to (and written to) a corresponding first row of cells in a remote computing device 656 database 662 and so on up to the last row of the computing device database 636 being mapped directly to (and written to) a corresponding last row of the remote computing device database 662. In other configurations, a subset of computing device 602 database 636 information may be stored in the remote computing device 656 database 662.

In order to store computing device 602 database 636 information in a remote computing device 656 database 662, the remote computing device 656 may retrieve information from the received 902 data and may store that information in the remote computing device 656 database 662. In one configuration, an instance of a supporting class 660 on the remote computing device 656 may retrieve information from the received 902 data based on attributes, since the computing device database 636 stores information based on the attributes. When the information is retrieved from the received 902 data, for example, the information may be retrieved based on column names and/or column properties (e.g., characteristics), which may be based directly or indirectly on original object 628 attributes. In some cases, the remote computing device 656 may only retrieve certain columns from the received 902 data based on column name and/or properties. In order to store 904 the information in the remote computing device 656 database 662, columns from the received 902 data may be generated, named, assigned properties and/or written to according to computing device 602 database 636 column names and/or properties that were based on object 628 attributes. In some configurations, the remote computing device 656 may convert 906 data types from the received data to data types that are compatible with the remote computing device 656 database 662. For example, the computing device 602 database 636 and the remote computing device 656 database 662 may use different data types and/or encode data differently.

The remote computing device 656 may optionally reconstruct 908 an object (e.g., generate a reconstructed object 658). As described above, the structure (e.g., column, row, etc.) of the received 902 data (from the computing device 602 database 636, for example) may indicate which original object 628 attribute (and object 628 member) the received 902 data corresponds to. In some cases, the remote computing device 656 may load the received 902 data into the reconstructed object 128. For example, the remote computing device 656 may set properties or fields of members (and/or attributes) in a reconstructed object 658 in order to reproduce an original object 628 from the computing device 602.

In one configuration, the remote computing device 656 may read column names in the received 902 data in order to determine which data in the received 902 data corresponds to which member in the reconstructed object 658. The remote computing device 656 may then retrieve data from each column of the received 902 data and set the value of each reconstructed object 658 member (with an attribute) equal to the data from each column of the received 902 data (in a row, for example). In order to accomplish this, the remote computing device 656 may match column names to object attributes or member identifiers with attributes in the reconstructed object 658. In this way, member data may be retrieved from the received 902 data and placed with reconstructed object 658 members (whose associated attributes or member identifiers match the column names), thereby generating a reconstructed object 658 based on the received 902 data (e.g., one or more attributes included in the received 902 data).

In some configurations, the received data may be converted 906. For example, one or more data types in the received 902 data may not be compatible for use with the reconstructed object 658. Thus, the remote computing device 656 may convert 906 the one or more data types of the received 902 data into one or more data types that are compatible for use with (e.g., generation of) the reconstructed object 658.

Figure 10:
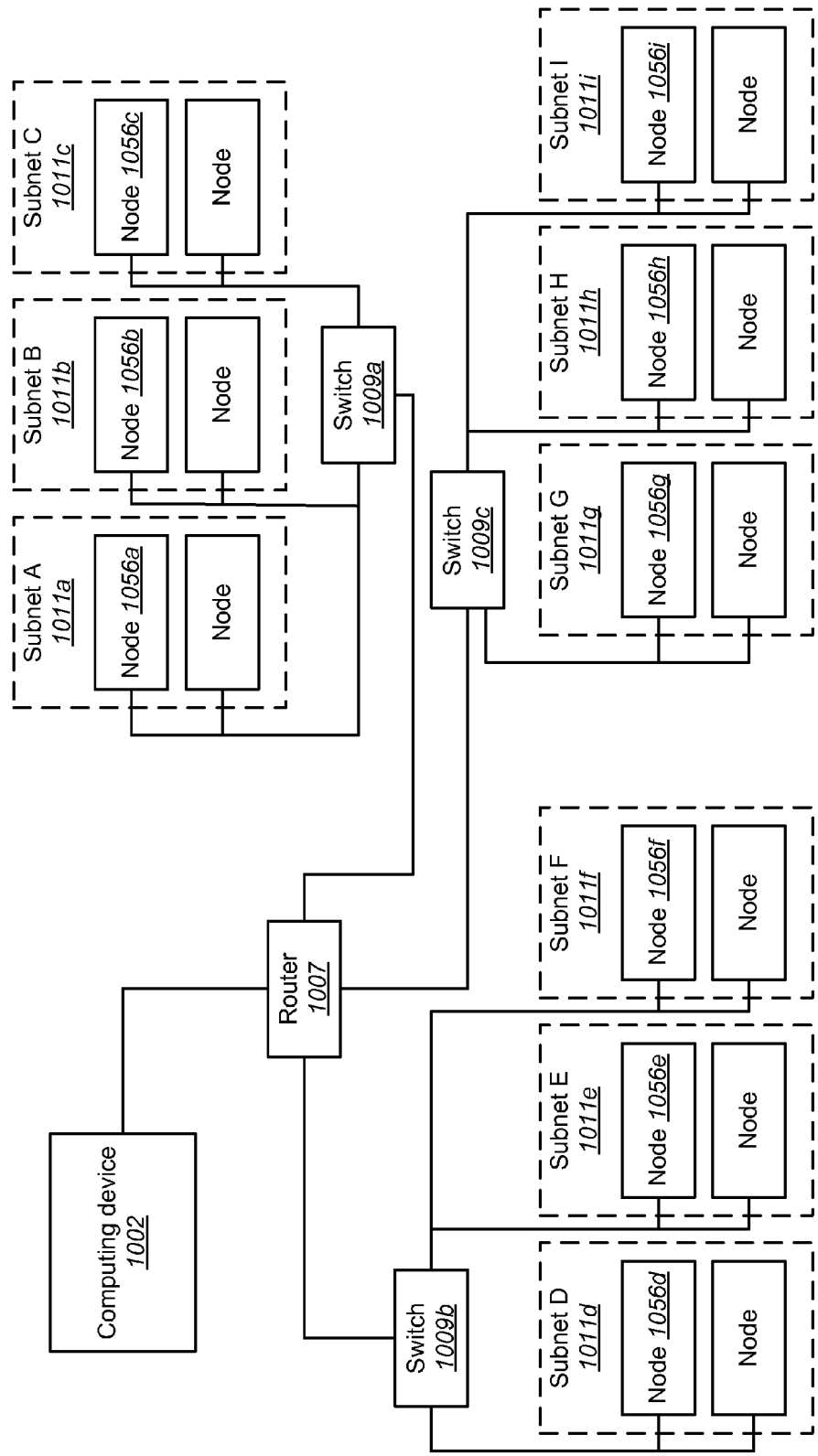
FIG. 10 is a block diagram that illustrates one configuration of a network where a system for using a member attribute to perform a database operation on a computing device may be implemented.

FIG. 10 is a block diagram that illustrates one configuration of a network where a system for using a member attribute to perform a database operation on a computing device may be implemented. A computing device 1002 is connected to a router 1007. The router 1007 is connected to switches 1009*a*, 1009*b*, 1009*c*. The switch 1009*a* is connected to several nodes 1056*a*, 1056*b*, 1056*c*, etc., via their respective subnets 1011*a*, 1011*b*, 1011*c*. The switch 1009*b* is connected to several nodes 1056*d*, 1056*e*, 1056*f*, etc., via their respective subnets 1011*d*, 1011*e*, 1011*f*. The switch 1009*c* is connected to several nodes 1056*g*, 1056*h*, 1056*i*, etc., via their respective subnets 1011*g*, 1011*h*, 1011*i*. Although FIG. 10 only shows one router 1007, and a limited number of switches 1009, subnets 1011 and nodes 1056, many and varied numbers of routers 1007, switches 1009, subnets 1011 and nodes 1056 may be included in networks and/or systems where a system for using a member attribute to perform a database operation may be implemented. A node 1056 as illustrated in FIG. 10 may be configured similarly to the remote computing device 656 illustrated in FIG. 6.

Figure 11:
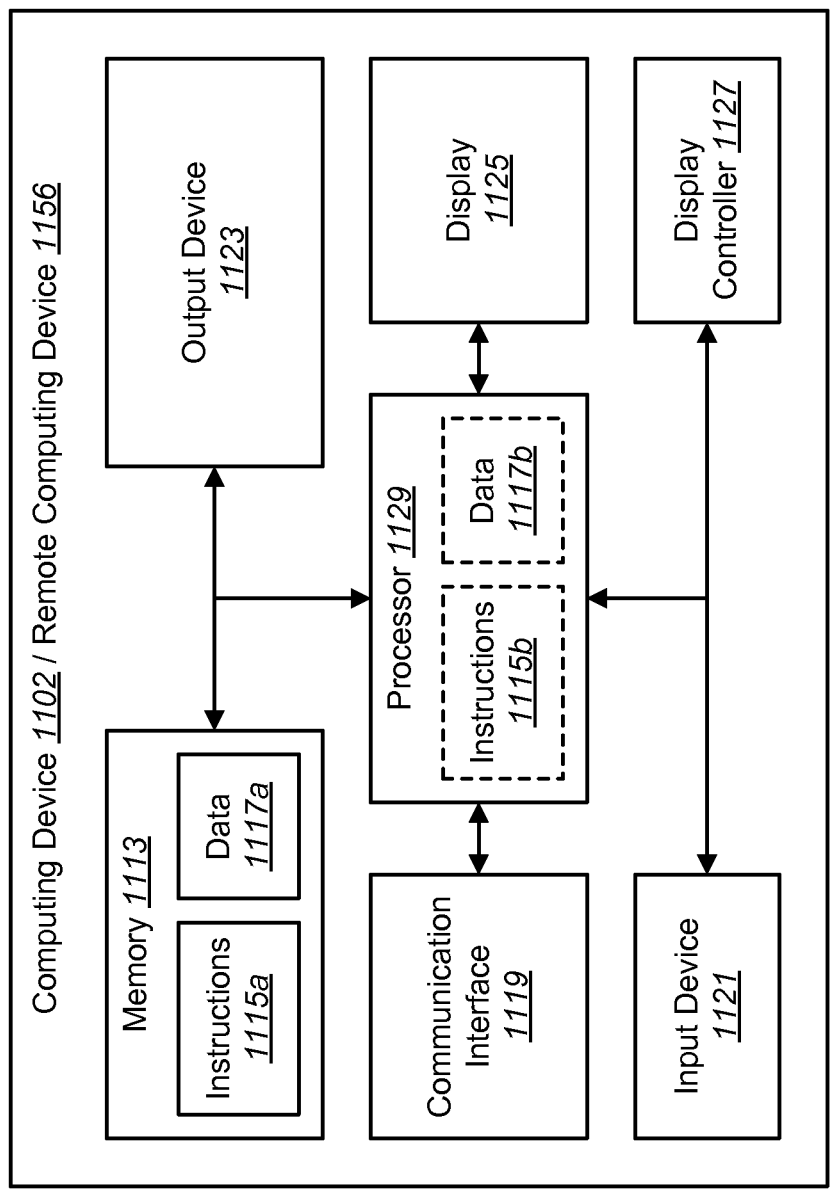
FIG. 11 illustrates various components that may be utilized in a computing device and/or in a remote computing device.

FIG. 11 illustrates various components that may be utilized in a computing device 1102 and/or in a remote computing device 1156. The illustrated components may be located within the same physical structure or in separate housings or structures.

The computing device 1102 or remote computing device 1156 may include a processor 1129 and memory 1113. The memory 1113 may include instructions 1115*a* and data 1117*a*. The processor 1129 controls the operation of the computing device 1102 or remote computing device 1156 and may be, for example, a microprocessor, a microcontroller, a digital signal processor (DSP) or other device known in the art. The processor 1129 may be in electronic communication with the memory 1113. The processor 1129 typically performs logical and arithmetic operations based on program instructions 1115b and/or data 1117b it loads from the memory 1113.

The computing device 1102 or remote computing device 1156 typically may include one or more communication interfaces 1119 for communicating with other electronic devices. The communication interfaces 1119 may be based on wired communication technology, wireless communication technology, or both. Examples of different types of communication interfaces 1119 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter and so forth.

The computing device 1102 or remote computing device 1156 typically may include one or more input devices 1121 and one or more output devices 1123. Examples of different kinds of input devices 1121 include a keyboard, mouse, microphone, remote control device, button, joystick, trackball, touchpad, lightpen, etc. Examples of different kinds of output devices 1123 include a speaker, printer, etc. One specific type of output device that may be typically included in a computer system is a display device 1125. Display devices 1125 used with configurations disclosed herein may utilize any suitable image projection technology, such as a cathode ray tube (CRT), liquid crystal display (LCD), light-emitting diode (LED), gas plasma, electroluminescence, or the like. A display controller 1127 may also be provided for converting data 1117a stored in the memory 1113 into text, graphics and/or moving images (as appropriate) shown on the display device 1125.

Of course, FIG. 11 illustrates only one possible configuration of a computing device 1102 or remote computing device 1156. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable statement or many computer-readable or processor-readable statements.

The term "computer-readable medium" refers to any available medium that can be accessed by a computer or processor. By way of example and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured for performing a database operation, comprising:
a processor;
memory in electronic communication with the processor;

instructions stored in the memory, the instructions being executable to:
  generate an object based on a class with a member, wherein the member has an associated attribute in the class, wherein the associated attribute indicates a database mapping and indicates that member data for the member is mapped to a database column in a database, wherein the associated attribute explicitly in Boolean indicates that the database column is read-only and should not be written to when the class is serialized to the database, wherein the associated attribute further indicates a column name that is different from an identifier for the member that is mapped to the database column, wherein the object is mapped to a database row, and wherein the object generated comprises two new fields that were not part of the class, and wherein the two new fields comprise a first field for a database table name and a second field for a primary key column name; and
  perform the database operation based on the associated attribute, wherein the associated attribute is an attribute according to an existing software framework.

2. The computing device of claim 1, wherein the instructions are further executable to generate a supporting object based on a supporting class with a method for performing the database operation based on the attribute.

3. The computing device of claim 1, wherein performing the database operation comprises storing the member data in the database based on the attribute.

4. The computing device of claim 3, wherein performing the database operation further comprises:
  retrieving the member data from the database; and
  reconstructing the object based on the member data.

5. The computing device of claim 3, wherein performing the database operation further comprises transmitting information from the database using a network.

6. The computing device of claim 3, wherein performing the database operation further comprises converting a data type of the member data.

7. The computing device of claim 3, wherein performing the database operation further comprises storing the member data in another database.

8. A method configured for performing a database operation, comprising:
  generating, on a computing device, an object based on a class with a member, wherein the member has an associated attribute in the class, wherein the associated attribute indicates a database mapping and indicates that member data for the member is mapped to a database column in a database, wherein the associated attribute explicitly in Boolean indicates that the database column is read-only and should not be written to when the class is serialized to the database, wherein the associated attribute further indicates a column name that is different from an identifier for the member that is mapped to the database column, wherein the object is mapped to a database row, and wherein the object generated comprises two new fields that were not part of the class, and wherein the two new fields comprise a first field for a database table name and a second field for a primary key column name; and
  performing, on the computing device, the database operation based on the associated attribute, wherein the associated attribute is an attribute according to an existing software framework.

9. The method of claim 8, further comprising generating a supporting object based on a supporting class with a method for performing the database operation based on the attribute.

10. The method of claim 8, wherein performing the database operation comprises storing the member data in the database based on the attribute.

11. The method of claim 10, wherein performing the database operation further comprises:
  retrieving the member data from the database; and
  reconstructing the object based on the member data.

12. The method of claim 10, wherein performing the database operation further comprises transmitting information from the database using a network.

13. The method of claim 10, wherein performing the database operation further comprises converting a data type of the member data.

14. The method of claim 10, wherein performing the database operation further comprises storing the member data in another database.

15. A non-transitory tangible computer-readable medium for performing a database operation, comprising executable instructions for:
  generating an object based on a class with a member, wherein the member has an associated attribute in the class, wherein the associated attribute indicates a database mapping and indicates that member data for the member is mapped to a database column in a database, wherein the associated attribute explicitly in Boolean indicates that the database column is read-only and should not be written to when the class is serialized to the database, wherein the associated attribute further indicates a column name that is different from an identifier for the member that is mapped to the database column, wherein the object is mapped to a database row, and wherein the object generated comprises two new fields that were not part of the class, and wherein the two new fields comprise a first field for a database table name and a second field for a primary key column name; and
  performing the database operation based on the associated attribute, wherein the associated attribute is an attribute according to an existing software framework.

16. The computing device of claim 1, wherein the associated attribute indicates that the database column is read-only when the column name includes a dot.

* * * * *